(12) United States Patent
Nagayama

(10) Patent No.: US 7,189,163 B2
(45) Date of Patent: Mar. 13, 2007

(54) T-NUT FOR HOPPER FEEDING HAVING A PROJECTION

(75) Inventor: Yutaka Nagayama, Kishiwada (JP)

(73) Assignee: Nagayama Electronic Industry Co., Ltd., Naga-gun (JP)

( * ) Notice: Subject to any disclaimer, the term of this patent is extended or adjusted under 35 U.S.C. 154(b) by 95 days.

(21) Appl. No.: 10/860,015

(22) Filed: Jun. 4, 2004

(65) Prior Publication Data

US 2004/0247411 A1   Dec. 9, 2004

(30) Foreign Application Priority Data

Jun. 9, 2003 (JP) ............................. 2003-163650

(51) Int. Cl.
*B21K 1/70* (2006.01)
*F16B 37/04* (2006.01)

(52) U.S. Cl. .......................... 470/25; 470/20; 411/176

(58) Field of Classification Search ................ 411/176, 411/179; 470/25, 20; 72/356
See application file for complete search history.

(56) References Cited

U.S. PATENT DOCUMENTS

| 3,270,610 | A |   | 9/1966  | Knowlton ................... 411/427 |
| 3,356,401 | A |   | 12/1967 | Bertram .................. 52/506.05 |
| 3,771,272 | A |   | 11/1973 | Mihaly et al. ................. 52/617 |
| 4,341,053 | A |   | 7/1982  | Dettfurth et al. ............. 52/787 |
| 4,508,478 | A | * | 4/1985  | Leistner ....................... 411/176 |
| 4,875,817 | A |   | 10/1989 | Suzumura et al. .......... 411/171 |
| 5,195,854 | A |   | 3/1993  | Nagayama .................. 411/427 |
| 5,238,344 | A |   | 8/1993  | Nagayama .................. 411/183 |
| 5,348,432 | A |   | 9/1994  | Nagayama .................. 411/183 |
| 5,429,466 | A |   | 7/1995  | Nagayama .................. 411/179 |
| 5,501,558 | A | * | 3/1996  | Figge et al. ................. 411/176 |
| 5,503,596 | A |   | 4/1996  | Nagayama ................... 470/25 |
| 5,609,351 | A |   | 3/1997  | Vermillion ................... 280/611 |
| 5,823,729 | A |   | 10/1998 | Nagayama .................. 411/429 |
| 5,904,461 | A |   | 5/1999  | McKarge, Jr. .............. 411/302 |
| 5,908,664 | A |   | 6/1999  | Nagayama .................. 427/358 |
| 6,095,738 | A | * | 8/2000  | Selle ........................... 411/427 |
| 6,109,849 | A |   | 8/2000  | Nagayama .................. 411/181 |
| 6,129,493 | A | * | 10/2000 | Leistner et al. ............. 411/183 |
| 6,139,237 | A |   | 10/2000 | Nagayama .................. 411/181 |
| 6,183,181 | B1 |  | 2/2001  | Leistner et al. ............. 411/177 |
| 6,305,888 | B1 | * | 10/2001 | Leistner ...................... 411/177 |
| 6,439,818 | B1 |  | 8/2002  | Nagayama .................. 411/436 |
| 6,511,274 | B1 |  | 1/2003  | Nagayama .................. 411/179 |

FOREIGN PATENT DOCUMENTS

DE    G 91 15 292.5    2/1992

(Continued)

OTHER PUBLICATIONS

European Search Report of EP 04013418 dated Mar. 1, 2006.

*Primary Examiner*—Flemming Saether
(74) *Attorney, Agent, or Firm*—Wasterman, Hattori, Daniels & Adrian, LLP

(57) ABSTRACT

The present invention is to avoid the flange portion of a T-nut of from overlapping the portion between the claws of another T-nut, while the T-nut is supplied on a supply track provided on a nut applying machine, and also to engage the projections formed between the claws into a fixing material when the T-nut is knocked into the fixing material. There is provided a T-nut formed of a metal material in an integrated manner, having a shank portion 49 and an octagonal or almost octagonal flange portion 50, and two pairs of claws 55 to 58. The shank portion 49 has a caulking portion 51 and a female screw portion 52. The caulking portion 51 is formed thinner than the female screw portion 52. Projections 64, 65 are provided between each of the pairs of claws, formed by bending convex portions integrally formed with the flange portion 50 toward the second end of the shank portion 49.

4 Claims, 23 Drawing Sheets

| FOREIGN PATENT DOCUMENTS | | |
|---|---|---|
| JP | 895346 | 4/1994 |
| JP | 895348 | 4/1994 |
| JP | 908545 | 10/1994 |
| JP | 8-6739 | 1/1996 |
| JP | 2517493 | 4/1996 |
| JP | 2517494 | 4/1996 |
| JP | 2547171 | 8/1996 |
| JP | 2597288 | 1/1997 |
| JP | 2613166 | 2/1997 |
| JP | 2676181 | 7/1997 |
| JP | 1017904 | 8/1998 |
| JP | 2839472 | 10/1998 |
| JP | 2940898 | 6/1999 |
| JP | 3310879 | 5/2002 |
| JP | 3310928 | 5/2002 |
| JP | 3310934 | 5/2002 |
| JP | 3310939 | 5/2002 |
| JP | 3313097 | 5/2002 |
| JP | 3398298 | 2/2003 |

* cited by examiner

FIG. 1
(a)
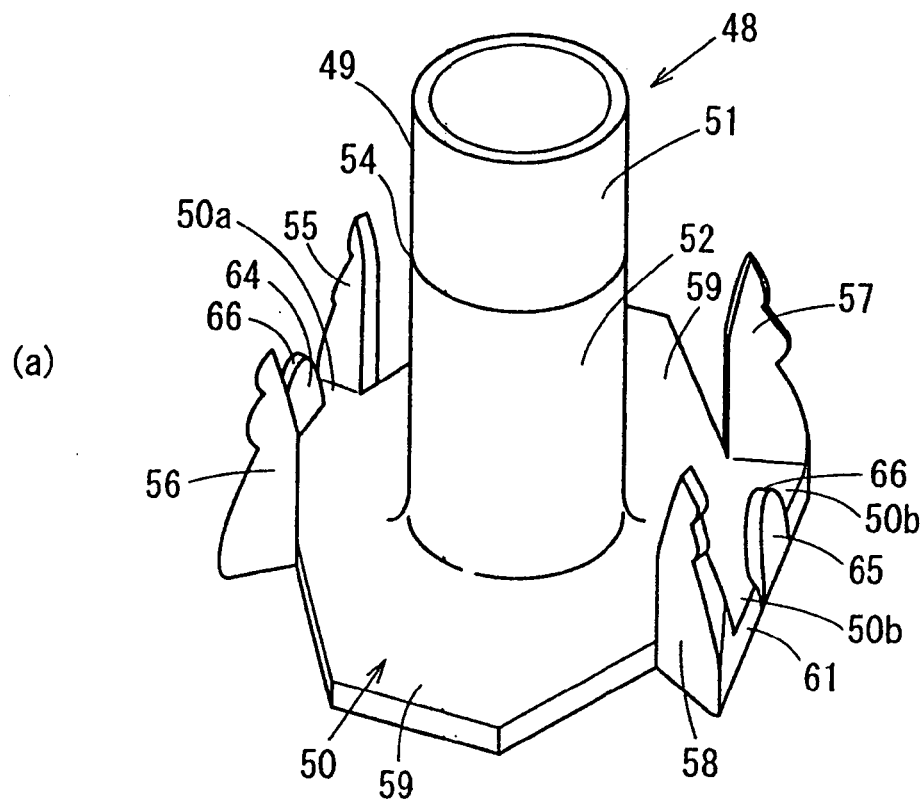
(b)
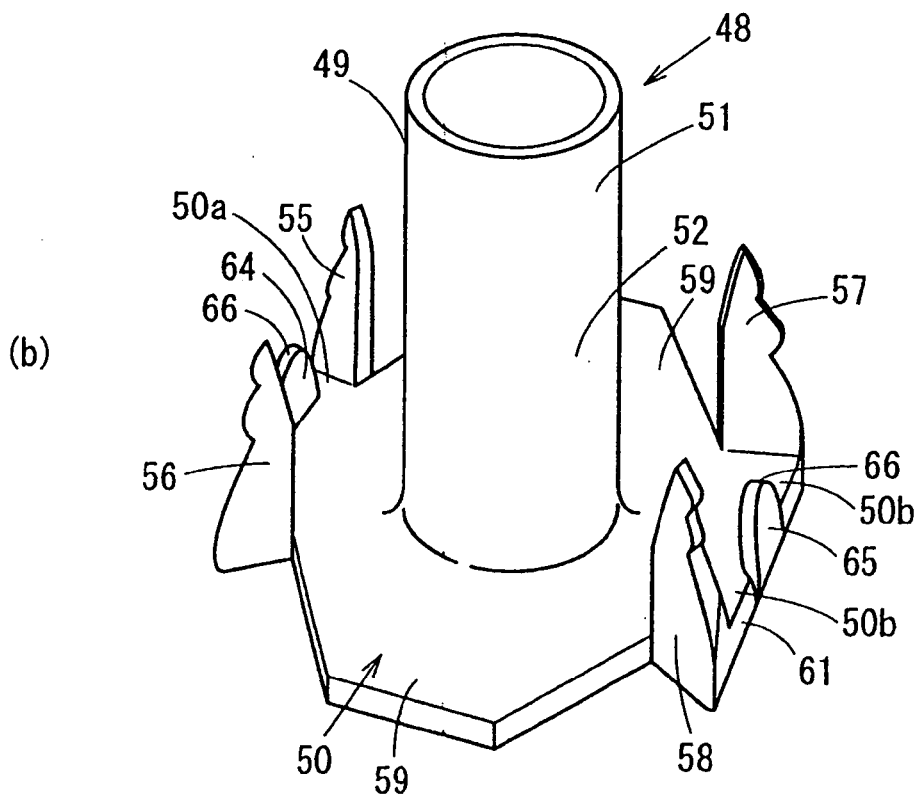

FIG. 2
(A)
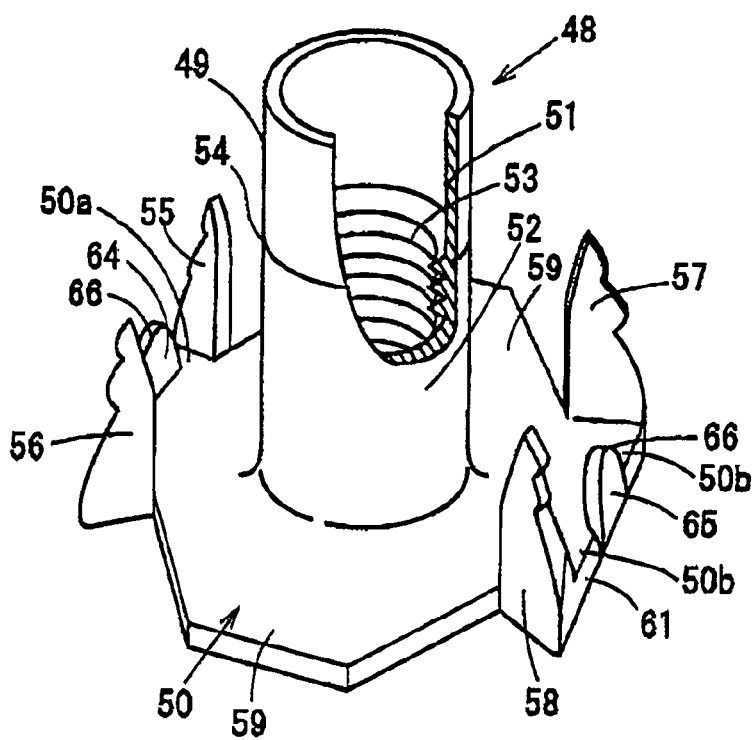
(B)
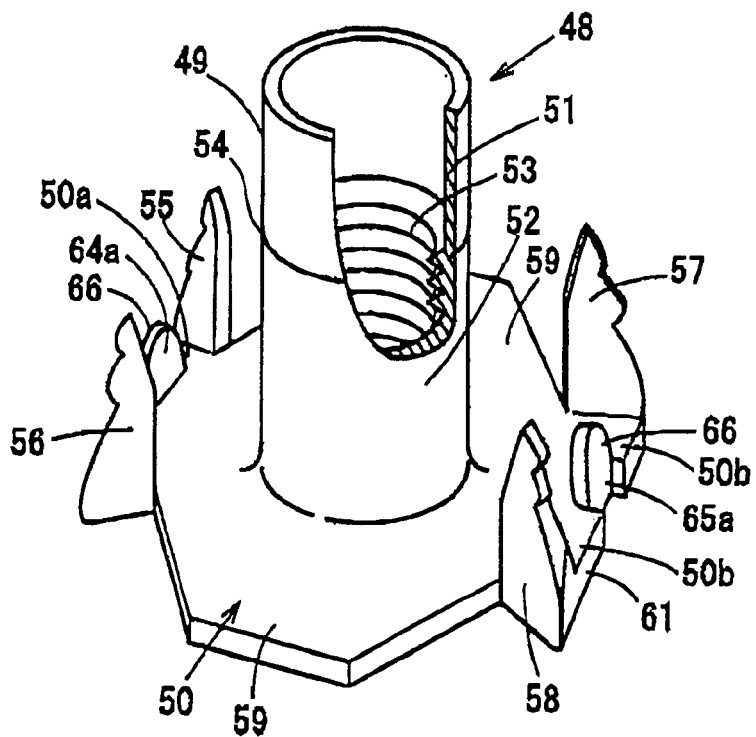

FIG. 3
(A)
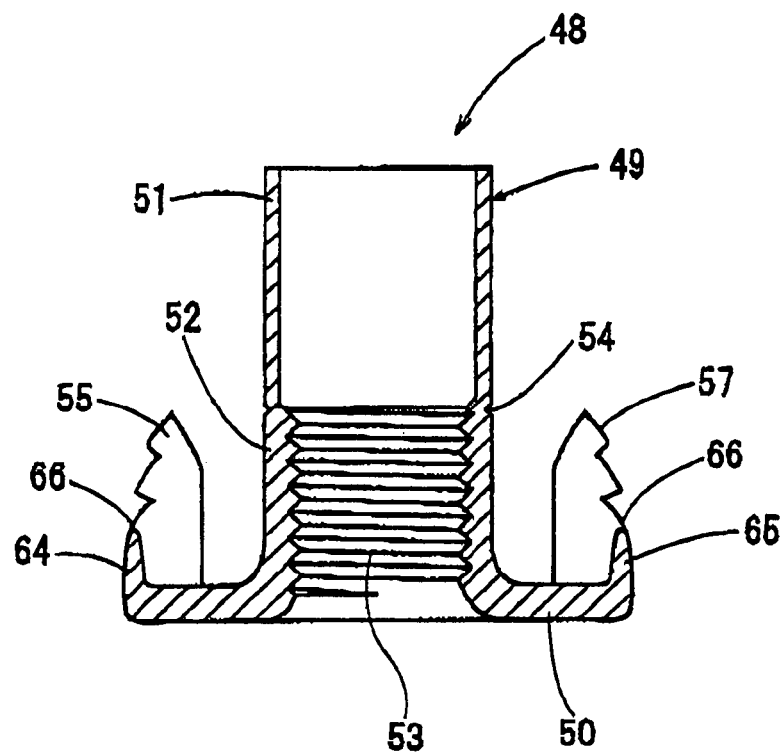
(B)
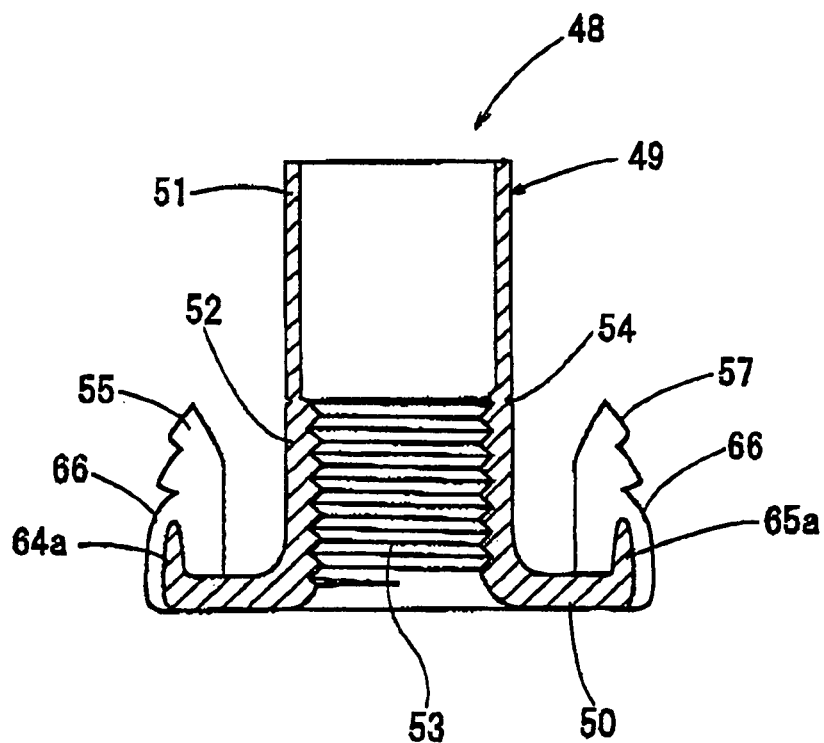

FIG. 4
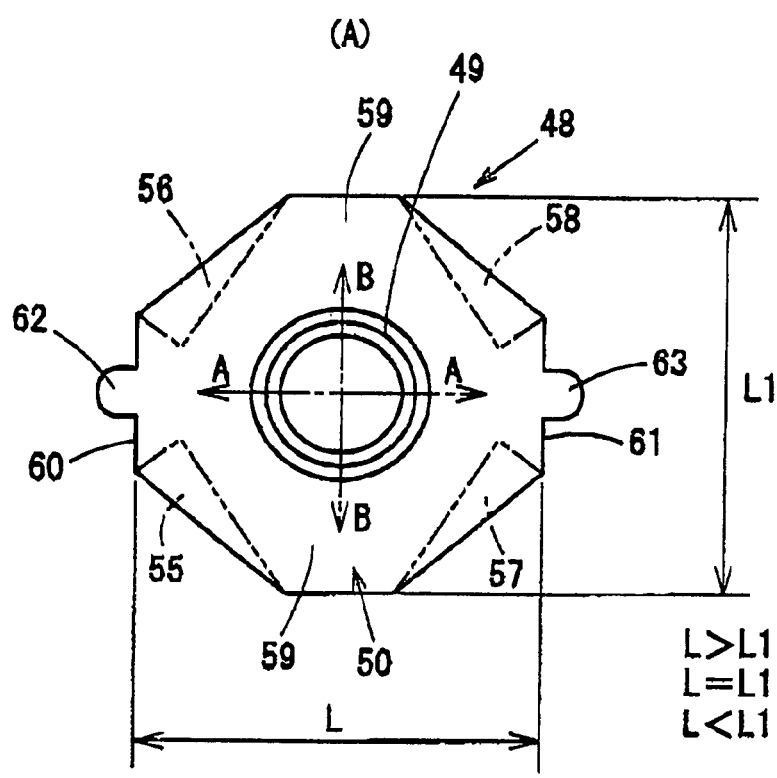
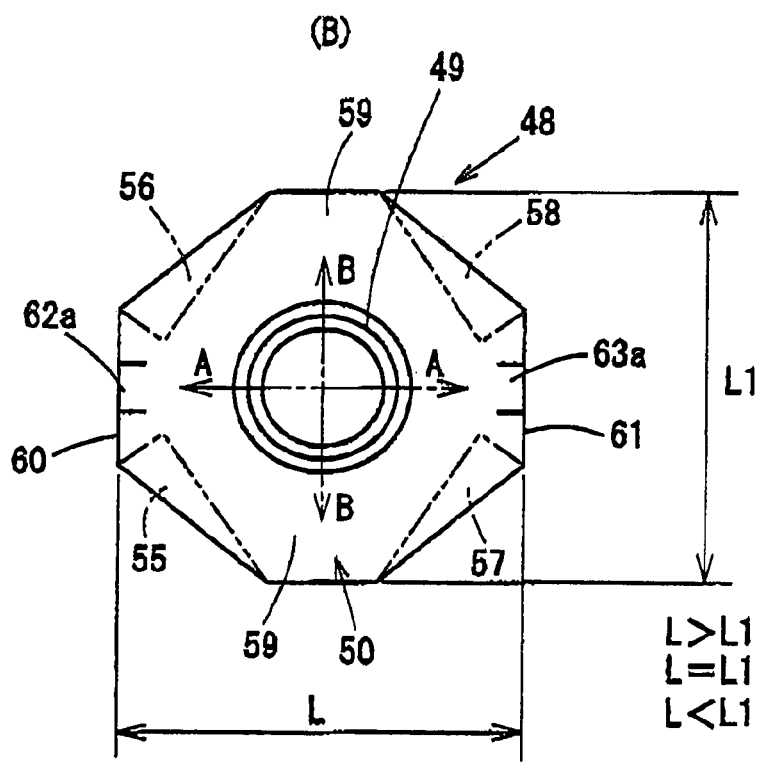

FIG. 5
(A)
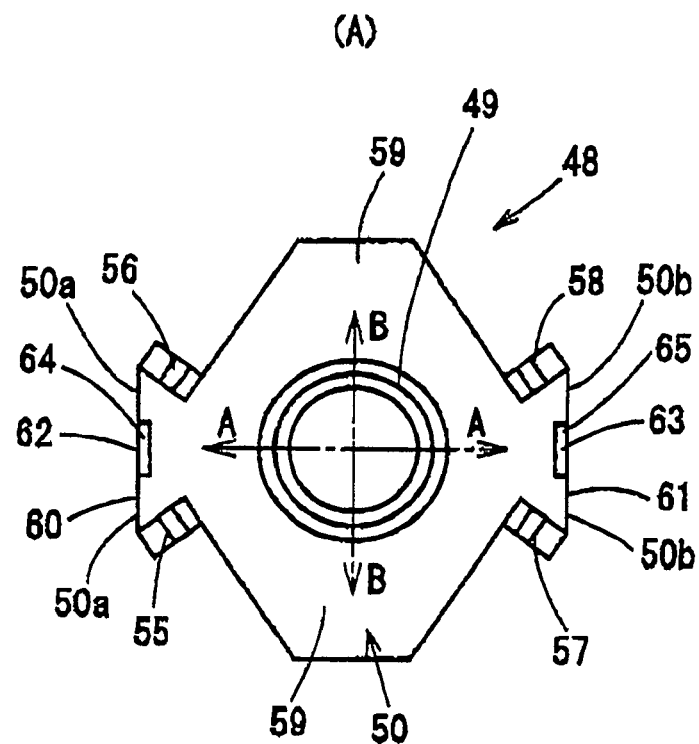
(B)
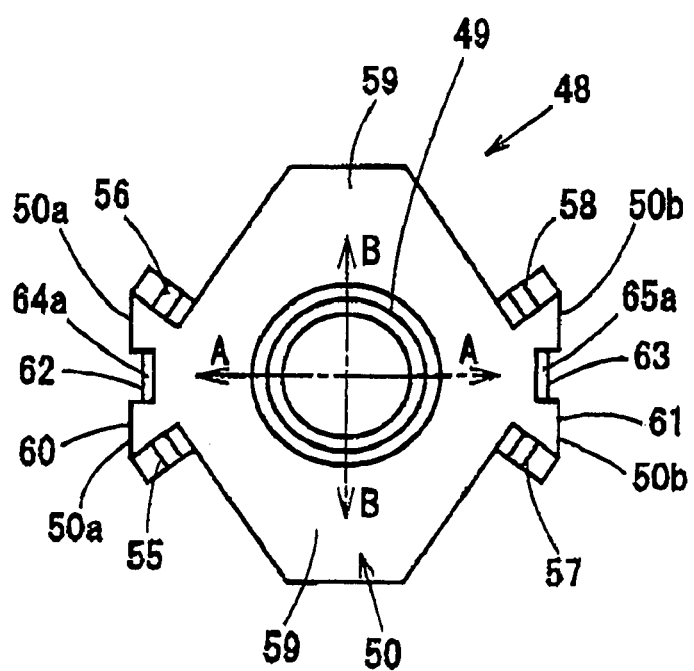

FIG. 7
(a)
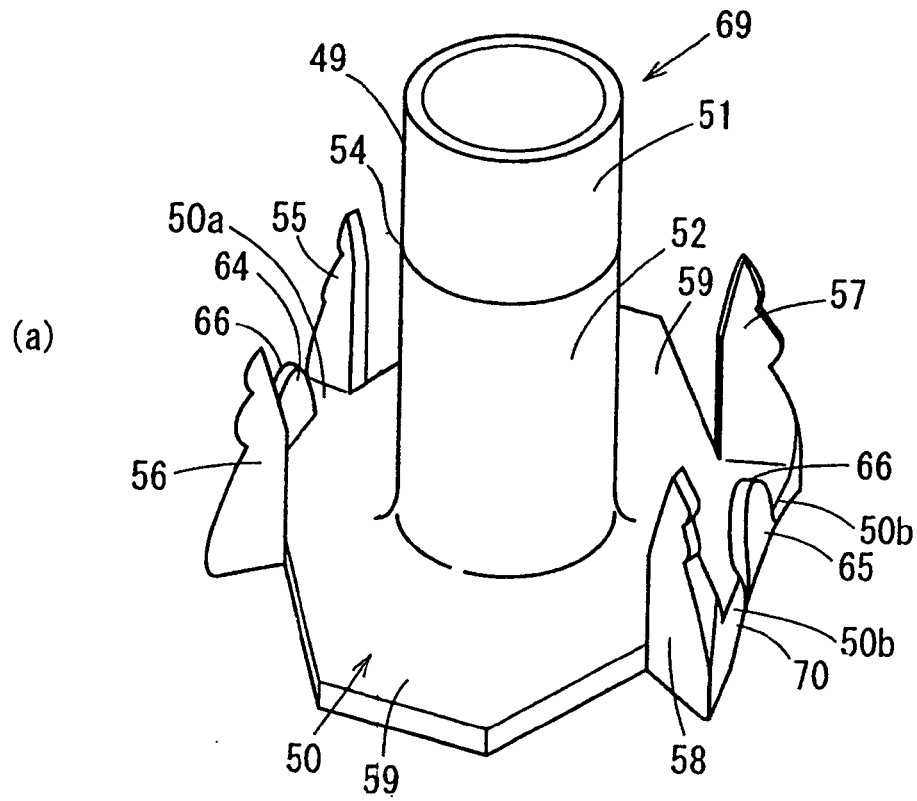
(b)
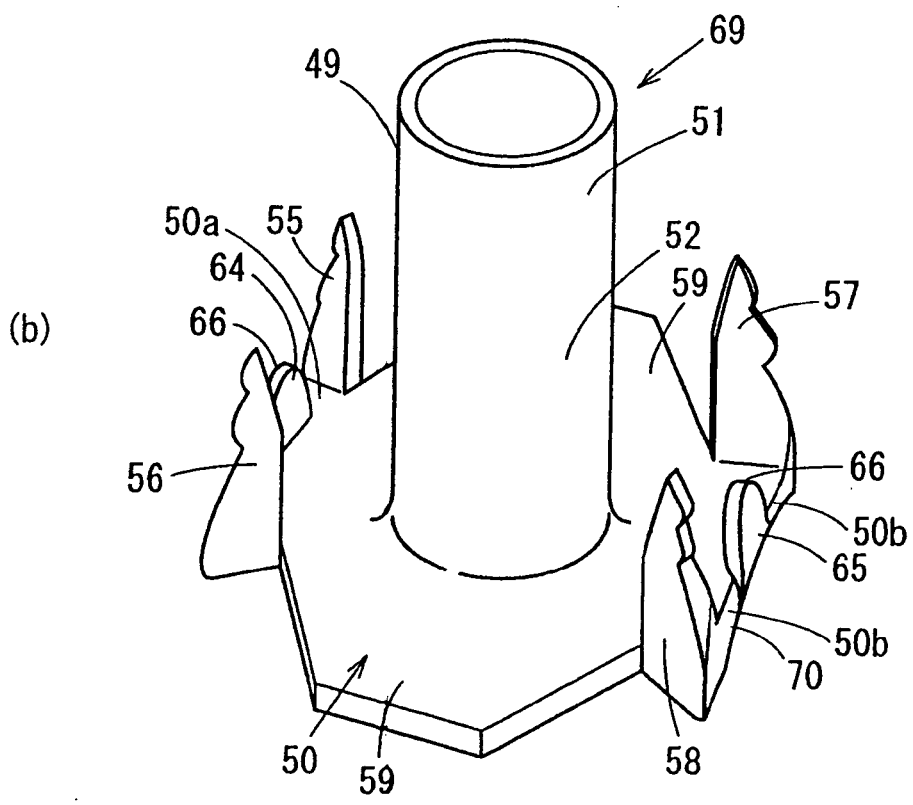

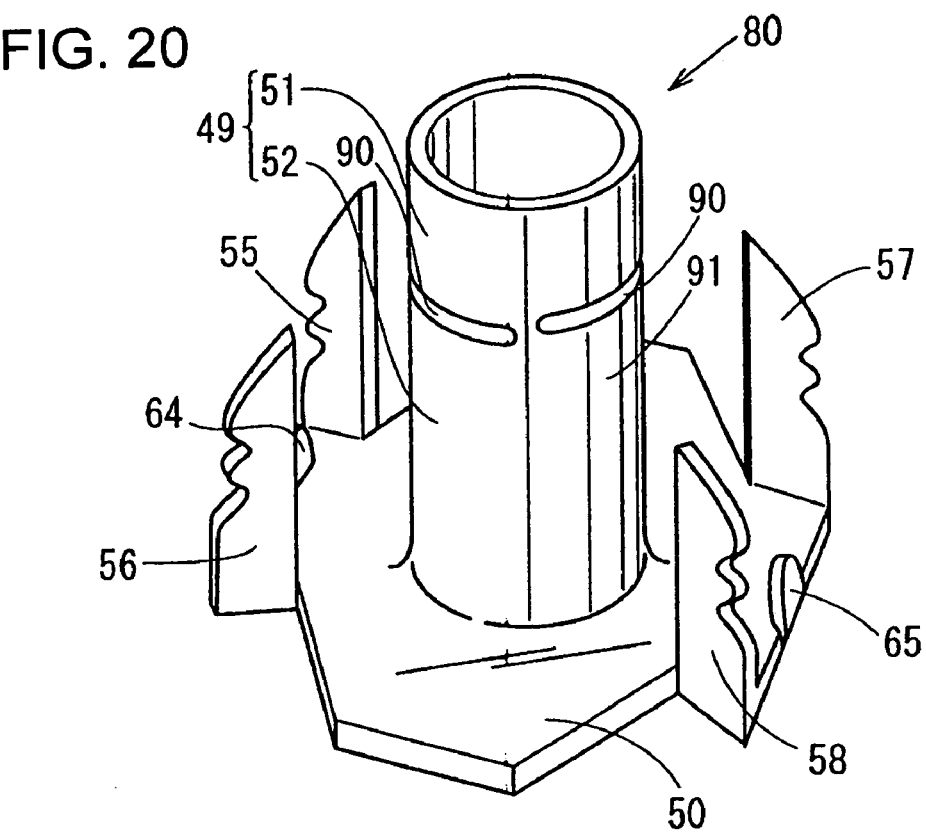
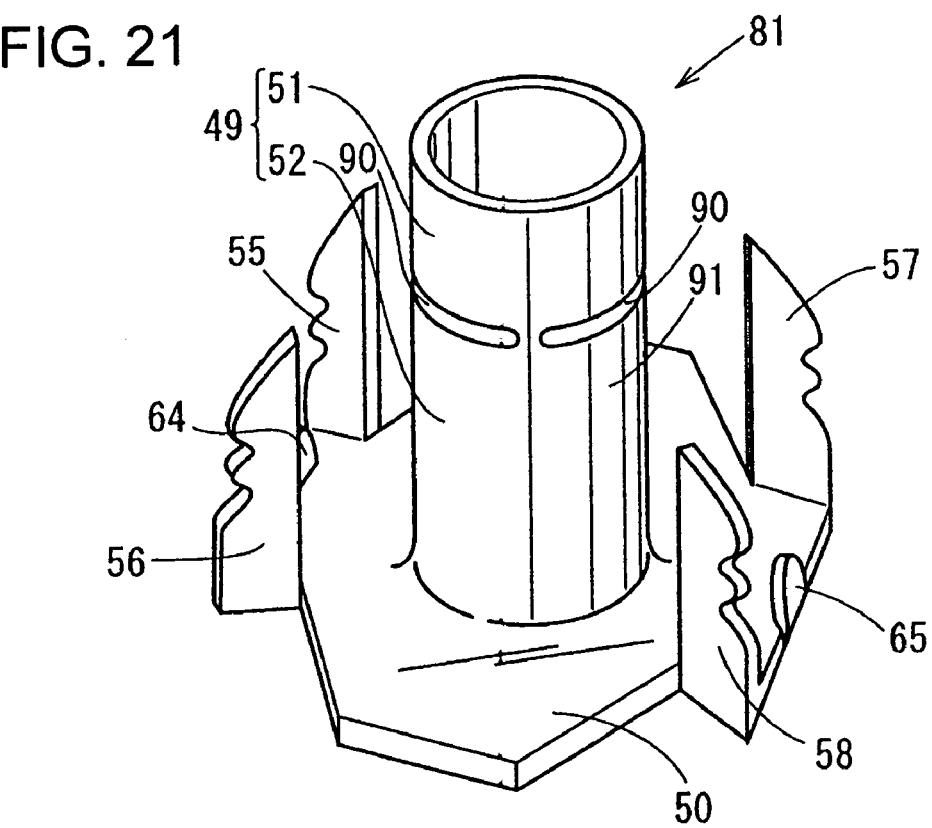

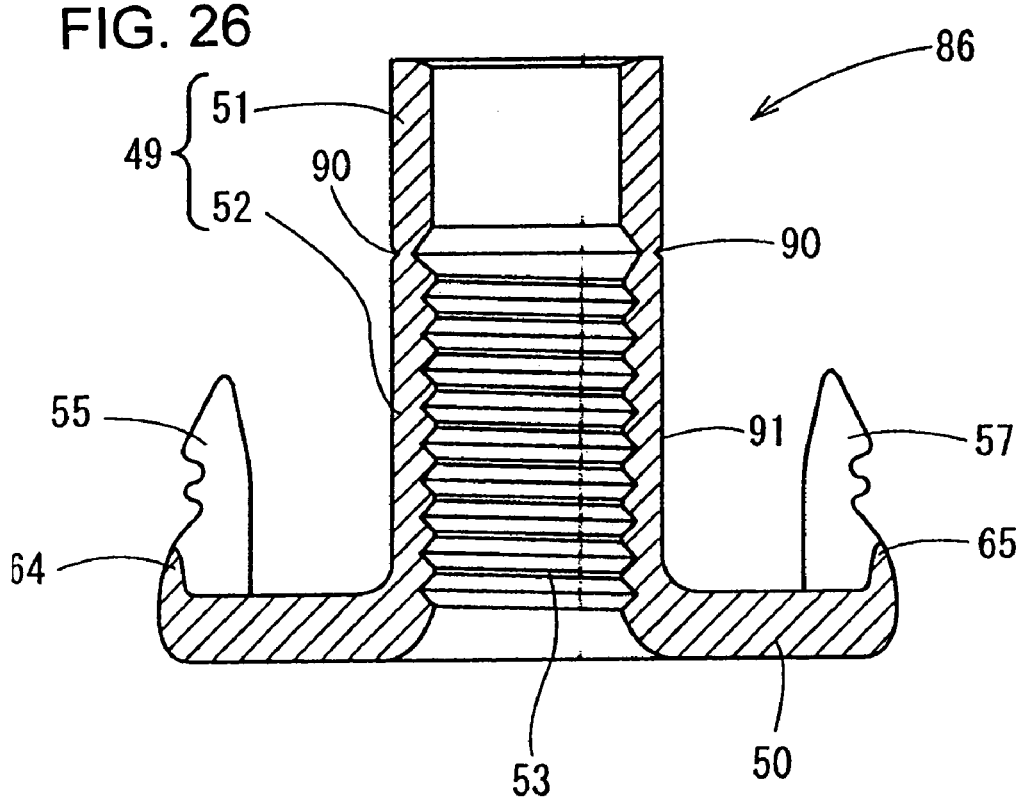
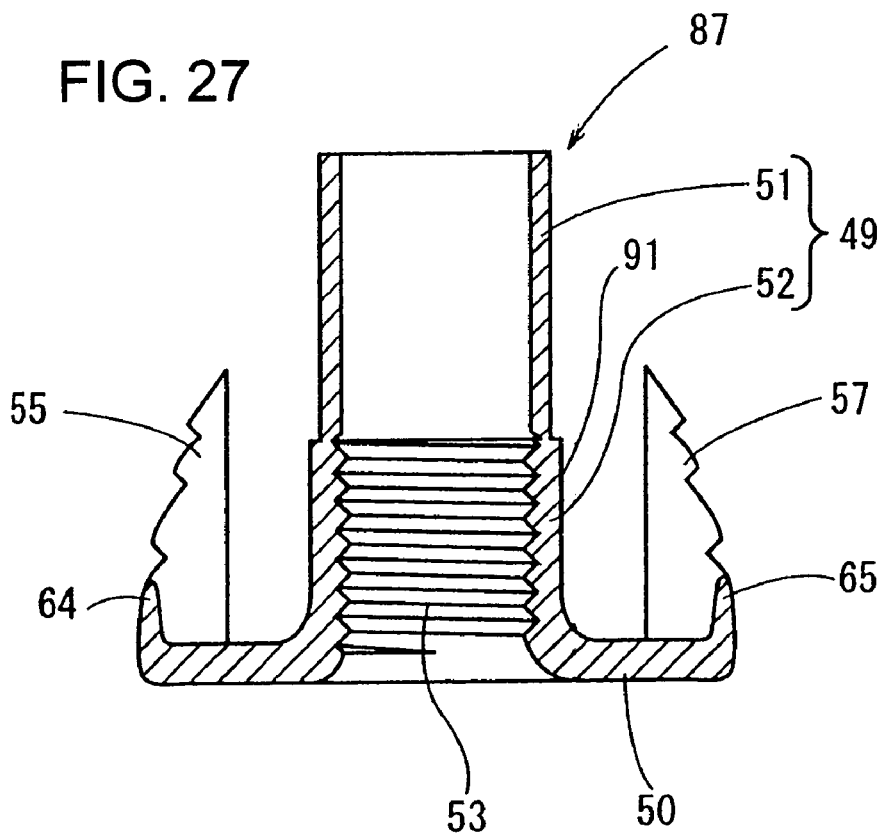

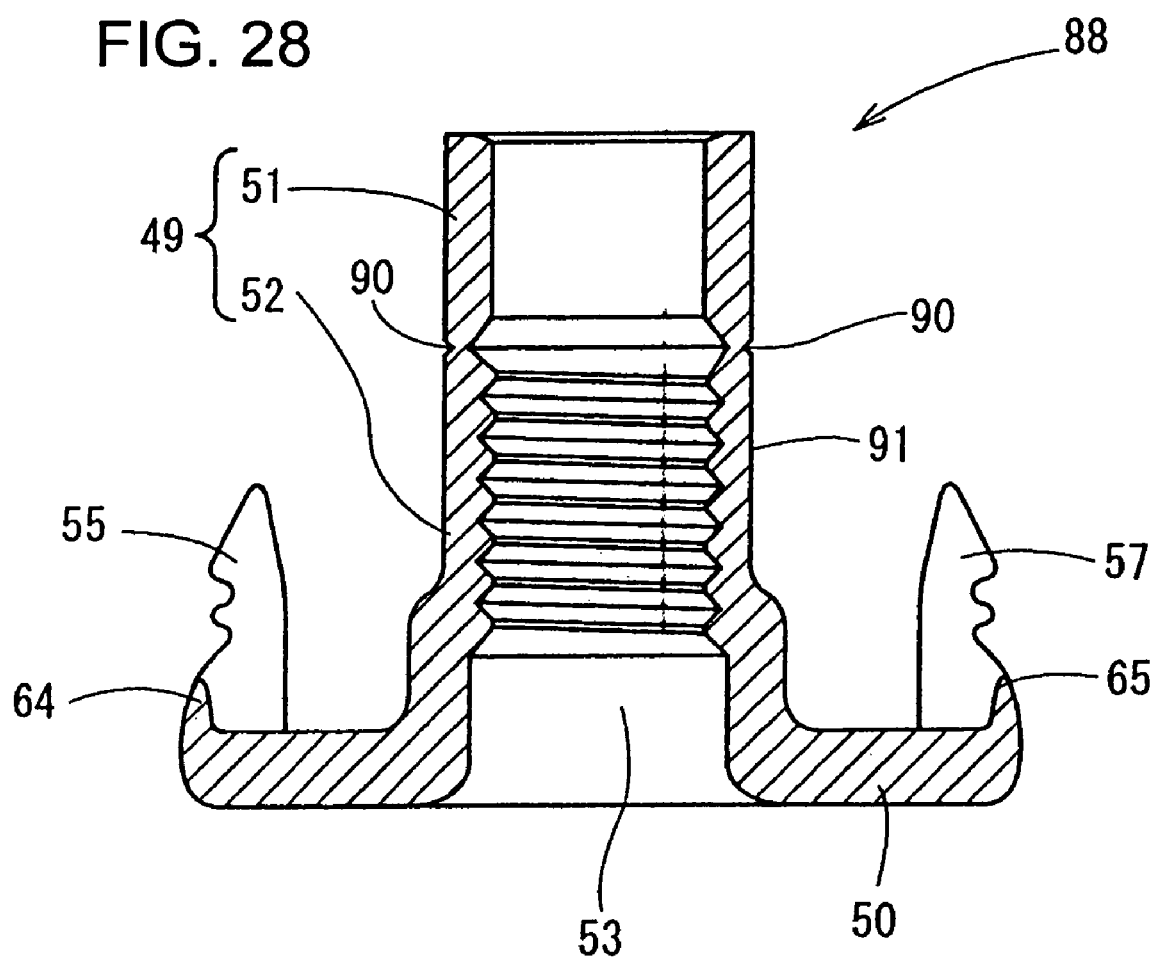

Prior Art

Prior Art

Prior Art

T-NUT FOR HOPPER FEEDING HAVING A PROJECTION

FIELD OF THE INVENTION

The present invention relates to a t-nut, and more specifically to a t-nut, or "counter bore hopper feed t-nut" having a caulking portion formed on a shank portion shaped into a cylindrical tube form. A female screw may be formed on the inside surface of the shank portion besides than the caulking portion. Several claws are formed on a flange portion thereof, which is horizontally projected outside from one end of the shank portion.

RELATED ART

FIG. 33 is a perspective view of a conventional t-nut which relates to the present inventions.

FIG. 33 shows a t-nut 1 which is integrally formed of a metal material. The t-nut has a shank portion 2 having a first end and a second end. The t-nut also has a flange portion 3 horizontally projected outwardly from the first end of the shank portion 2. The shank portion 2 is shaped into a cylindrical tube, and a female screw 4 is formed on the inside surface thereof. The female screw 4 is entirely formed on the inside surface of the shank portion 2.

The flange portion 3 has formed a first pair of claws 5, 6, and a second pair of claws 7, 8, each extending vertically. Each of the claws in pairs faces each other, across a first direction horizontally extending from the center axis of the shank portion shaped in a cylindrical tube. Each of the claws 5–8 is formed by partially cutting edges of the flange portion and bending them up to extend along the shank portion 2.

Such a t-nut 1 is fixed on a fixing material (fixing target), such as a wood. At fixing, a hole is previously formed on the fixing material. The shank portion 2 is inserted and hammered to engage the claws 5 to 8 into the fixing material. When the t-nut 1 is fixed on the fixing material, the t-nut 1 is avoided from rotation, and a screw component such as a bolt is screw-engaged with the female screw 4 formed on the inner surface of the shank portion 2.

Such a t-nut 1 is generally called as "hopper feed t-nut." These t-nuts are continuously supplied and fixed on a fixing material by means of a nut-fixing machine. The nut-fixing machine is provided with a feeding track, on which the t-nuts 1 are required to be smoothly transferred. The supplying of the t-nuts in the nut-fixing machine is automatic. For example, U.K. Pat. No. 1,157,734 discloses details of one type of such a "hopper feed t-nut."

Also, Japanese examined patent publication No. 3-71565, Japanese unexamined patent publication No. 5-118317, Japanese unexamined patent publication No. 6-323315, Japanese Patent No. 3310934 and Japanese Patent No. 3310939 discloses various types of conventional t-nuts.

FIG. 33 shows a feeding track 9, as mentioned above, which is shown by dashed lines. The feeding track 9 is provided with a pair of C-shaped guide rails 10, 11. The C-shaped guide rails 10, 11 are positioned symmetrically to each other, with an interval. Each of the guide rails 10, 11 accepts the flange portion 3, and the claws 5, 6, 7 and 8 are positioned in the interval between the guide rails 10, 11. The t-nut 1 is expected to be transferred along the feeding track 9 in a given position. Though the drawings do not describe, the feeding track 9 may be bent or curved in order to make the t-nut maintain the desired position on the feeding track 9. Thus, the t-nut is expected to keep the shank portion 2 properly aligned along the hole provided on the fixing material.

However, such a fixing of the t-nut as shown in FIG. 33 is obtained substantially by the claws 5 to 8, because the claws 5 to 8 are engaged into the fixing material. As time goes by, the engaging state with the fixing material by the claws 5 to 8 may loose. The t-nut 1 may be detached and fallen from the fixing material. Then, in order to avoid such problems, a t-nut 12 as shown in FIGS. 34 and 35 has been proposed. FIG. 34 shows a front view of the t-nut 12, and FIG. 35 shows a bottom view of the t-nut 12.

FIGS. 34 and 35 show a conventional t-nut 12. Similar to the t-nut 1 as shown in FIG. 33, it is integrally formed of a metal material. The t-nut 12 has a shank portion 13 and a flange portion 14 horizontally and outwardly projected from the first end of the shank portion 13. The shank portion 13 is shaped into a cylindrical tube, having a first end and a second end. The t-nut 12 is also provided with a caulking portion 15 formed at the second end of the shank portion 13. The t-nut 12 has formed a female screw 16 on the inner surface except the caulking portion 15. The caulking portion 15 of the shank portion 13 is thinner than the others of the shank portion 13.

Also, the flange portion 14 has a first pair of claws 17, 18 formed on the first edge of the flange portion 14, and a second pair of claws 19, 20 formed on the second edge of the flange portion. The claws in pairs face to each other across a first line extending from the center axis of the flange portion 14 shaped in a cylindrical tube. Each of the claws 17 to 20 is formed by partially cutting the edges of the flange portion 14 followed by bending them up so as to extend along the shank portion 13.

FIG. 36 shows the condition where the conventional t-nut 12 shown in FIGS. 34 and 35 is used and caulked. A fixing material 21, such as a wood material, is previously provided with a penetrating hole 22. Then, the shank portion 13 of the t-nit 12 is inserted into the penetrating hole 22. Under the state, a caulking process is subjected to the caulking portion 15 by means of a caulking machine. By applying such process, the caulking portion 15a is opened and tightly engaged with one surface of the fixing material 21. On the other surface of the fixing material 21, the claws 17 to 20 are engaged therein. Therefore, the t-nut 12 is tightly fixed to the fixing material 21.

The t-nut 12 as shown in FIG. 36 prevents it from rotating against the fixing material 21, since the t-nut 12 is firmly fixed. In addition, since the t-nut 12 engages the flange portion 14 and the caulking portion 15a with the fixing material 21 and, therefore, the t-nut 12 is less likely to be detached than the t-nut as shown in FIG. 33. As a result, the fixing state is maintained semi-permanently.

In the same manner to the t-nut 1 as shown in FIG. 33, the t-nut 12 shown in FIG. 34 is also adapted for a "hopper feed T-nut." Namely, the t-nut 12 is transferred on a feeding track 9 as shown in FIG. 33. However, in the feeding track 9 of a nut-fixing machine, problems sometimes occur, because a plurality of t-nuts 12 are continuously supplied and transferred in the feeding track 9, and movement of the feeding track 9 is sometimes stopped as follows:

As shown in FIG. 34, the flange portion 14 of the t-nut 14, before the claws 17 to 20 are formed by bending them up, is almost round. Thus, the first edge between the first pair of the claws 17, 18, and the second edge between the second pair of the claws 19, 20, has a curved edge 23, 24, which is projected outwardly. Therefore, when a plurality of the t-nuts 12, as shown in FIGS. 34 and 35, are continuously supplied and transferred on the feeding track 9, the adjacent flange portions 14 on the feeding track 9 may be overlaid one above the other. As a result, the feeding of the t-nut 12 on the feeding track 9 may often be stopped or clogged.

Meanwhile, the flange portion 3 of the t-nut 1 as shown in FIG. 33 has an octagonal shape, as a whole, and the first edge 25 between the first pair of the claws 5, 6, and the second edge 26 between the second pair of the claws 7, 8 are liner. Therefore, the overlaying of the flange portions one above the other is less likely happened.

Also, another conventional t-nut 27 is shown in FIG. 32, which is integrally formed of a metal material. The t-nut 27 as shown in FIG. 32 has a shank portion 28, having a first end and a second end, and a flange portion 29 horizontally and outwardly projected from the first end of the shank portion 28. The shank portion 28 is shaped into a cylindrical tube. The t-nut 27 is also provided with a caulking portion 30 at the second end of the shank portion 28. A female screw 31 is formed on the inner surface except the caulking portion 15. The caulking portion 30 of the shank portion 28 is designed to be thinner than the other of the shank portion 30. The flange portion 29 has a first pair of claws 32, 33 formed on the first edge of the flange, and a second pair of claws 34, 35 formed on the second edge of the flange. Each of the claws in pairs faces to each other across a first line extending from the center axis of the shank portion 28. Each of the claws 32 to 35 is formed by partially cutting the edges of the flange portion 29 followed by bending them up. In addition, each of the claws 32 to 35 is engrailed, as shown in FIG. 32, in order to improve the engagement with the fixing material. The flange portion 29 of the t-nut 27 is almost octagonal, and the first edge 36 between the first pair of the claws 32, 33, and the second edge 37 between the second pair of the claws 34, 35 are liner. Similar to the above mentioned t-nut 1 as shown in FIG. 1, the t-nut 27 is less likely causing the overlaying of the flange portions 29 one above the other, even if a plurality of t-nut is continuously fed and transferred on a feeding track 9 of a nut-fixing machine.

However, if the guide rails 10, 11 of C-shape have a broad space to accept the flange portion and the t-nut is slid on the feeding track 9 as shown in FIG. 33, there may occur the overlaying problems, even if the flange portion of the t-nut are almost octagonal, as shown in FIGS. 32 and 33.

Then, another t-nut 29 as shown in FIG. 29 has been proposed to overcome the drawbacks of the conventional t-nut 1 (as shown in FIG. 33), t-nut 12 (as shown in FIG. 34), and t-nut 29 (as shown in FIG. 32). The t-nut 38 (as shown in FIGS. 29 to 31) has projections 44, 45 formed on a first edge between a first pair of claws 39, 40, and on a second edge between a second pair of the claws 41, 42. The projections 44, 45 are obtained by partially upthrowing the edges.

The projections 44, 45 of the t-nut 38 prevents the flange portions 43 from overlaying one above the other, while a plurality of t-nut are continuously supplied and transferred on a feeding track.

However, since the projections 44, 45 are upthrown in the same direction as the claws 39 to 42, the projections cannot be engaged in the fixing target. In other words, when the t-nut is hammered on the fixing material, the claws 39–42 cannot be completely engaged into the fixing material, due to the projection 44, 45. Therefore, t-nut of FIG. 29 makes a gap between the flange portion 43 and the fixing material, even after engaged.

PROBLEMS THAT THE INVENTION SOLVES

As mentioned above, the projections 44, 45 of the t-nut 38, as shown in FIG. 29, are formed by partially upthrowing edges of the flange portion 43 in the same direction as the claws 39 to 42. Therefore, the projections cannot be entirely engaged into the fixing material, even if the t-nut is knocked and hammered into the fixing material. Thus, a gap is unnecessarily generated between the surfaces of the fixing material and the flange portion 43. Also, there may be t-nut 38 engaged with the penetrating hole of the fixing material in a tilted manner. While a fixing component such as a bolt is then applied to the engaged t-nut, screw-engaging of the female screw 47 with the fixing component results in improperness or unstableness.

Also, the projections 44, 45 of the t-nut 38 contact the fixing material near the penetrating hole formed on the fixing material. Therefore, in case of the fixing material is made of a wood or synthesis resin, the fixing material may be cracked near the penetrating hole.

Also, the projections 44, 45 make the engagement incomplete, and the shank portion 46 is eventually engaged in a tilted condition relative to the fixing material of a wood. As a result, fine wood shavings can leave on the female screw 47 of the shank portion 46. The fine wood shavings are generated by shaving the inner surface of the penetrating hole at the time of knocking or hammering. The wood shavings also interrupt a complete engagement of a bolt with the female screw 47 on the shank portion 46 and, therefore, the fixing component cannot be firmly fixed on the fixing material.

In view of the above, it may be considerable that the shank portion is made longer, in order to compensate the portion not to be engaged due to the projections 44, 45. However, this may result in increasing the cost for production and sales because of increase of the amount of the metal material.

The present invention has been developed in view of the above. One objective of the present invention is to avoid flange portions overlaying one above the other, when a plurality of t-nuts are continuously fed and supplied on a feeding track of a nut-fixing machine. Another objective of the present invention is to provide a t-nut having a projection which avoids the overlaying, and which enables to engage it into the fixing material when knocked and hammered.

SUMMARY OF THE INVENTION

In order to solve the objectives, the present invention has been developed to have the following features: According to the t-nut recited of one aspect of the present invention, it is formed of a metal material in an integrated manner, comprising:

a shank portion having a first end and a second end;

a flange portion extending outside from the first end of the shank portion, wherein the shank portion is shaped in a cylindrical form having a hollow therein, wherein the second end of the shank body has a thin thickness to be formed into a caulking portion, by the steps comprising:

determining a central portion, which is to be formed into a center of the flange, on a metal board;

cupping the central portion, that is to be formed into the flange, in a direction of a main surface of the metal board, so as to form a cupped portion to be formed into the shank body;

forming a penetrating hole on a tip of the cupped portion;

making an second outer diameter of the tip of the cupped portion, which is formed into the portion for caulking, thinner than an first outer diameter of a base portion, which it to correspond to a female screw portion, so as to the tip portion (the portion for caulking) has the thickness thinner than the base portion (the female screw portion);

shrinking an outer diameter and an inner diameter of the base portion, and extending the base portion while almost maintaining the thickness of the tip portion and the base portion;

forming a female screw on an inner surface of the base portion; and cutting an outer periphery of the flange portion to extend in a direction from the first end to the second end, so as to form two pairs of claws, each of the pairs being facing each other over a first radial direction of the flange portion, wherein the flange portion has a pair of flat portion projecting toward both sides of the shank portion, which are on a second radial direction crossing the first radial direction, wherein each of the pairs of the claws comprises two claws placed adjacent to each other, wherein each of the pairs of the claws are intervened by a linear edge, wherein the flange portion is shaped, as a whole, into an exact or almost octagonal form, wherein a convex portion is formed between the two pairs of the claws, extending toward the direction of the first radial direction of the flange portion, and wherein the convex portion is bent toward the second end to form a projection.

According to the t-nut of the second aspect of the present invention, it is according to the first aspect, and in addition, a ring-shaped mark line is formed on a border between the tip portion and the base portion, when shrinking the outer diameter and the inner diameter of the base portion, and extending the base portion.

According to the t-nut of the third aspect of the present invention, it is formed of a metal material in an integrated manner, comprising:

a shank portion having a first end and a second end;

a flange portion extending outside from the first end of the shank;

a bump portion formed on the shank portion;

a tip-side cylinder portion formed from the second end to the bump portion of the bump portion; and a base-side enlarged cylinder portion formed from the first end to the bump portion of the shank portion, wherein the tip-side cylinder portion comprises a portion for caulking formed from the second end to have a predetermined length, and a female screw portion having a female screw, formed on a nearer region to the bump portion than the portion for caulking, the female screw portion having an inner diameter smaller than the portion for caulking, wherein an outer periphery of the flange portion is cut to extend in a direction from the first end to the second end, so as to form two pairs of claws, each of the pairs being facing each other over a first radial direction of the flange portion, wherein the flange portion has a pair of flat portions projecting toward both sides of the shank portion, which are on a second radial direction crossing the first radial direction, wherein each of the pairs of the claws comprises two claws placed adjacent to each other;

wherein each of the pairs of the claws are intervened by a linear edge;

wherein the flange portion is shaped, as a whole, into an exact or almost octagonal form;

wherein a convex region is formed between the two pairs of the claws, extending toward the direction of the first radial direction of the flange portion, and wherein the convex region is bent toward the second end to form a projection.

According to the t-nut of the fourth aspect of the present invention, it is according to the third aspect, and in addition, the base-side enlarged cylinder portion is shaped into a hollow cylinder having both an inner diameter and an outer diameter larger than those of the tip-side cylinder portion.

According to the t-nut of the fifth aspect of the present invention, it is according to the fourth aspect, and in addition, the female screw of the female screw portion of the tip-side cylinder portion is continuously formed on an inner surface of the base-side enlarged cylinder portion, to extend to a predetermined length from the bump portion According to the t-nut of the sixth aspect of the present invention, it is according to any of the third, fourth and fifth aspects, and in addition, the caulking portion of the shank portion has an inner diameter larger than, and a thickness thinner than, those of the female screw portion.

According to the t-nut of the seventh aspect of the present invention, it is according to any of the first, second, third, fourth, fifth, and sixth aspect, and in addition, the convex portion is formed such that both side of the convex portion are adjacent to each of the claws of each of the pairs, and wherein the convex portion is bent toward the second end so as to form the projection.

According to the t-nut of the eighth aspect of the present invention, it is according to any of the first, second, third, fourth, fifth, sixth and seventh aspect, and in addition, between each of the pairs of the claws, 55, 56, and 57, 58, the projection 64, 65 are formed via a front supply periphery 50*a* and a back supply periphery 50*b*, wherein the front supply periphery 50*a* is engaged with the back supply periphery 50*b* while the T-nut is supplied on a supply track provided on a nut applying machine, for fixing the T-nut on a fixing material, wherein the projection provided on the front supply periphery 50*a* or the back supply periphery 50*b* of one T-nut is engaged with the projection provided on the back supply periphery 50*a* or the front supply periphery 50*b* of another T-nut, which is next to the one T-nut in the supply track, so as to prevent the front supply periphery or the back supply periphery of the one T-nut from overlaying on the back supply periphery or the front supply periphery of the another T-nut, and so as to enable the T-nut to be almost perfectly buried into the fixing material with the flange being parallel to the surface of the fixing material.

According to the t-nut of the ninth aspect of the present invention, it is according to any of the first, second, third, fourth, fifth, sixth, seventh and eight aspect, and in addition, each of the pairs of the claws are intervened by a curved edge.

According to the t-nut of the tenth aspect of the present invention, it is according to any of the first, second, third, fourth, fifth, sixth, seventh, eight and ninth aspect, and in addition, each of the pairs of the claws are intervened by a linear or curved edge, wherein the projection is formed on a line along the edge, or inside the line along the edge, or outside the line along the edge.

According to the t-nut of the eleventh aspect of the present invention, it is according to any of the first, second, third, fourth, fifth, sixth, seventh, eight, ninth and tenth aspect, and in addition, a trench is formed in a region nearer to the flange portion than a portion bent by caulking in the caulking portion, and in the region of an almost ring-shape of the outer diameter of the shank portion, wherein the trench is formed on at least one of an outer surface and an inner surface by thinning the thickness of the shank to extend the trench in a radial direction of the shank, wherein the trench does not break by a force worked in an axis direction of the shank, which works on to the fixing material under a use condition in fixing and caulking, wherein the trench breaks and separates the shank into two fragments when a tensile strength is worked beyond a predetermined level.

According to the t-nut of the twelfth aspect of the present invention, it is according to any of the first, second, third, fourth, fifth, sixth, seventh, eight, ninth, tenth and eleventh aspect, and in addition, the flange portion is formed by the following formula: L>L1, L<L1, or L=L1, wherein "L" represents a side length, and "L1" represents a longitudinal length.

According to the t-nut of the thirteenth aspect of the present invention, it is according to any of the first, second, third, fourth, fifth, sixth, seventh, eight, ninth, tenth, eleventh and twelfth aspect, and in addition, at least a part of an outer surface of the female screw portion, at least one concave portion is formed by depressing the outer surface inside, so as to make it irregular.

BRIEF DESCRIPTION OF THE DRAWINGS

FIG. 1(a) shows an enlarged perspective view of the t-nut having a ring-shaped marking line as the first embodiment. FIG. 1(b) shows an engaged perspective view of the t-nut without having a ring-shaped mark line as the first embodiment.

FIG. 2 shows enlarged perspective views of the t-nuts as being partially cut, in which FIG. 2(A) shows the t-nut as shown in FIG. 1(a), and FIG. 2(B) shows a t-nut having the projections 64a, 65a formed inside the linier edges.

FIG. 3 shows enlarged cross sectional views of the t-nut at the center thereof, in which FIG. 3(A) shows the t-nut as shown in FIG. 2(A), and FIG. 3(B) shows the t-nut as shown in FIG. 2(B).

FIG. 4 shows illustrative views of the flange portions of the t-nuts in the state before as the partially cut edges is bent up to form the projections, in which FIG. 4(A) shows the t-nut as shown in FIG. 2(A) and FIG. 4(B) shows the t-nut as shown in FIG. 2(B).

FIG. 5 shows illustrative views, in which FIG. 5(A) shows the state where the flange portion of the t-nut as shown in FIGS. 1(a) and 1(b) is cut to obtain the projections, followed by bending them to form the convex portions, and FIG. 5(B) shows a flange portion of another t-nut is cut to obtain the projections, followed by bending them to form the convex portions.

FIG. 7(a) shows an enlarged perspective view of the t-nut having a ring-shaped mark line as the second embodiment. FIG. 7(b) shows an engaged perspective view of the t-nut without having a ring-shaped mark line as the second embodiment.

FIG. 20 shows an enlarged perspective view of another t-nut according to the present invention.

FIG. 21 shows an enlarged perspective view of another t-nut according to the present invention.

FIG. 26 shows an enlarged cross sectional view of another t-nut according to the present invention, showing the center thereof.

FIG. 27 shows an enlarged cross sectional view of another t-nut according to the present invention, showing the center thereof.

FIG. 28 shows an enlarged cross sectional view of another t-nut according to the present invention, showing the center thereof.

DETAILED DESCRIPTION OF THE PREFERRED EMBODIMENT

Figure 6:
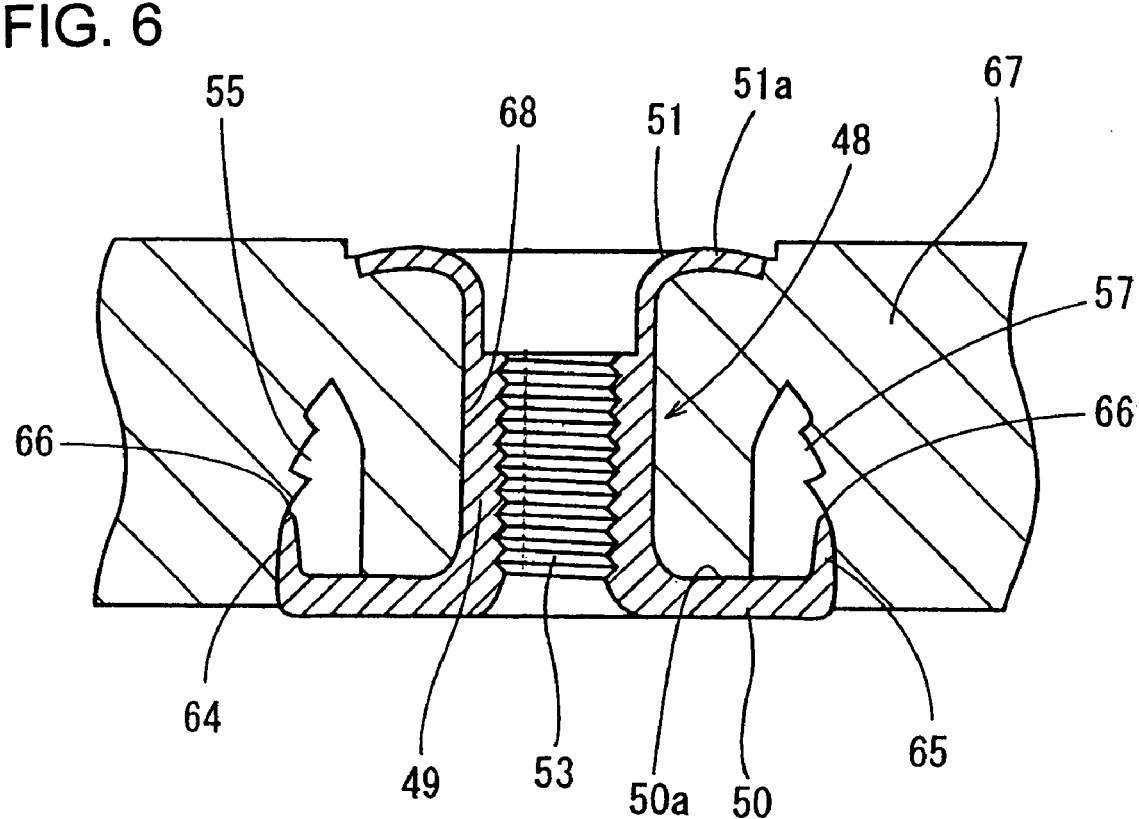
FIG. 6 shows a cross sectional view of the condition where the t-nut as shown in FIGS. 1(a) and 1(b) is engaged into the fixing material.
Figure 8:
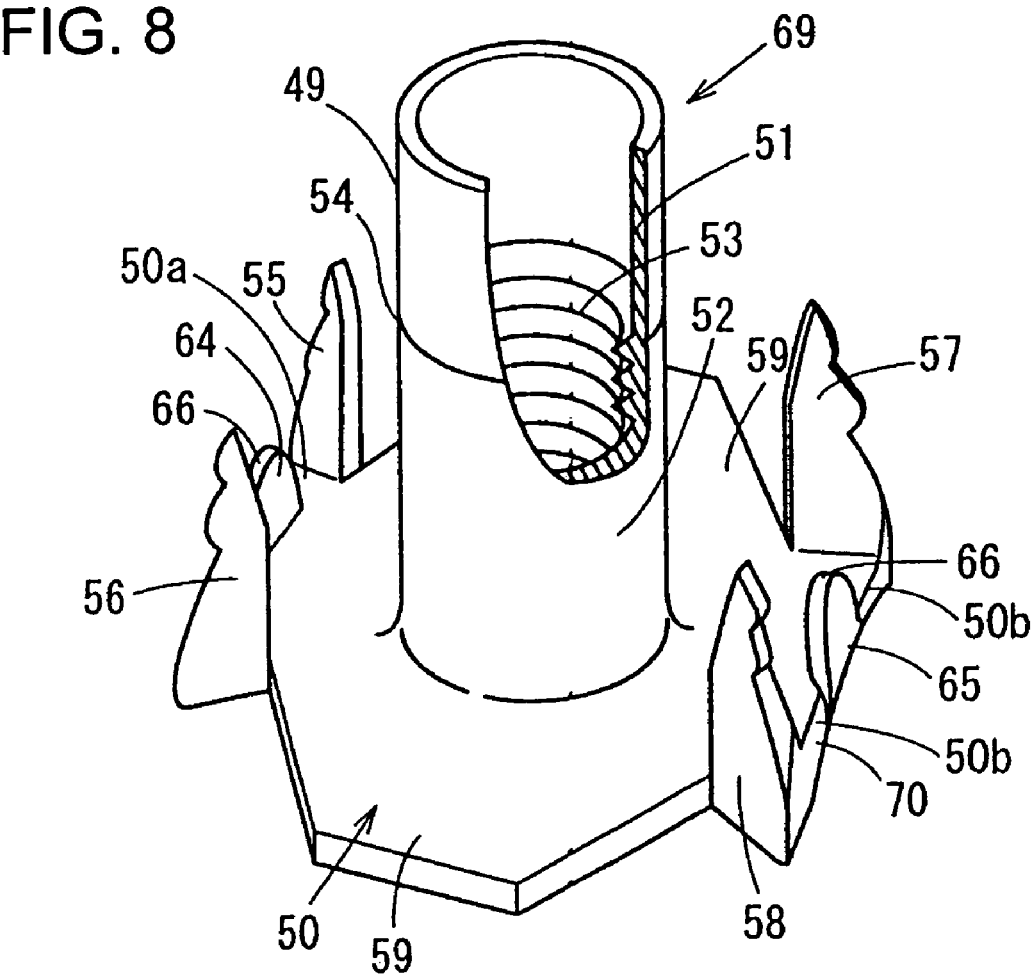
FIG. 8 shows an enlarged perspective view of the t-nut as shown in FIG. 1(a), as being partially cut.

The t-nut of the present invention is described in detail based on preferred embodiments is as follows. FIGS. 1 to 6 show a first embodiment of the t-nut 48 of the present invention.

The t-nut can be obtained integrally formed by, for example, processing a metal plate of a ferric series, so as to have a shank portion 49 and a flanged portion 50. The shank portion 49 has a first end and a second end. The flange portion 50 is projected horizontally and outwardly from the first end of the shank portion 49.

The shank portion 49, having a first end and a second end, is shaped into a cylindrical tube, so as to have a hollow portion therein. The shank portion 49 closer to the second end is pressed to form a caulking portion 51. On the other hand, the shank portion 49 closer to the first end, that is a base portion, is formed to have a female screw on the inside surface of the cylindrical tube of the shank portion 49. Thus, the inner surface of the base portion has a female screw 53. The shank portion closer to the second end, that is the caulking portion 51, has a thickness thinner than that of the shank portion closer to the first end, that is the base portion. The female screw 53 may be formed by subjecting the inner surface of the shank portion 49 to a screw-forming process either from the first end of the shank portion 49 or the second end of the shank portion 49.

The t-nut 48, as shown in FIG. 3 is described more in detail. The shank portion 49, as shown, has a caulking portion 51, a female screw portion 52 and a female screw 53. The shank portion is prepared as follows: A metal board is provided. A portion to be formed into the flange portion 50 is determined on the metal board. The center to be formed into the flange portion 50 is cupped from one of the surfaces of the metal board to be protruded, the cupped portion of the metal board being then shaped into the shank portion 49.

Then, a penetrating hole is formed on a tip or bottom of the cupped portion. The cupped portion closer to the tip or bottom is made thinner than the cupped portion closer to the metal board which is not cupped. Thus, the cupped portion closer to the tip or bottom is formed into the caulking portion 51, and the cupped portion closer to the metal board is formed into the base portion. The base portion may be also called as a female screw portion 52. The cupped portion to be formed into the caulking portion 51 is formed to have an outer diameter smaller than that of the cupper portion to be formed into the base portion, that is the female screw portion 52.

Then, while the base portion is almost maintained to have the thickness thereof, both of the outer diameter and the inner diameter of the base portion are shrunk or small-sized, coincidently the length of the base portion being extended. Thereby, a thick portion to be formed into the female screw portion 52 and a thin portion to be formed into the caulking portion 51 are prepared on the shank portion 49, not by a scraping process but by, for example, a deformation process such as casting. Then, the female screw 53 is formed on the inner surface of the base portion.

When forming the caulking portion 51 and the female screw portion 52, a ring-shaped mark line 54 is formed on the border between the caulking portion 51 and the base portion, that is female screw portion 52. According to the present invention, it is possible that the ring-shaped mark line 54 may be omitted to be formed on the outer surface thereof, as shown in FIG. 1(b).

The first pair of claws 55, 56 and the second pair of claws 57, 58 are formed on the outer edge of the flange portion 50. These claws 55 to 58 directions vertically to be along the shank portion 49. Each of the claws in pairs faces each other across the first radial direction of the flange portion 50. The first radial direction extends from the center axis of the shank portion to extend horizontally. These claws 55 to 58 are formed by cutting the flange portion 50 at the first edge and the second edge. Each of the claws 55 to 58 as shown in FIG. 1 has an engrailed edge, which improves the engagement of the t-nut with the fixing material, such as wood. However, it is possible to omit forming the engrailed edge at the claws.

The flange portion 50 has a pair of flat portions 59 horizontally and outwardly projected from the first end of the shank portion 49. Each of the flat portions 59 is symmetrically formed across the shank portion 49. The flat portion is also placed on a second line BB, which extends from the center of the shank portion 49. The second line BB crosses with the first line, which places the claws 55 to 58, at an angle of 90°, as shown in FIGS. 4 and 5. The flat portions 59 are adapted for transferring the t-nut on the guide rail of the t-nut fixing machine. The flange portion, when viewed vertically from the above, is almost octagonal. In particular, liner edges 60, 61 are placed between the first pair of the claws 55, 56 and between the second pair of the claws 57, 58, as shown in FIG. 5.

On the first edge 60 and between the claws 55, 56, and on the second edge 61 between the claws 57, 58, which are explained above, the flange portion 50 is cut to have convex portions 62, 63 to extend toward the direction of the first radial direction A—A of the flange portion 50. The convex portions 62, 63 are then bent vertically to be along the claws 55 to 58, so as to from edge projections 64, 65. That is, the t-nut of the present invention has a flange portion 50 having edge projection 64, 65 formed by bending the first and second edges, so as to form the edge projections 64, 65 facing the above. The edge projections 64, 65 may be located on the first and the second edges, or inside the first and the second edges, or outside the first and the second edges.

Each of the edge projections 64, 65 has and edge facing the above, so that the edge projections 64, 65 can be easily engaged into the fixing material 67, such as wood. The edge projection 64, 65 is formed into a shape having a pointed tip, and for example, a half ellipsoid of cutting an ellipsoid at its short axis, having a small round top 66, as shown in the drawings. Also, each of the projections 64, 65 has an almost uniform thickness. The shape of the edge projections 64, 65 is not limited to the embodiment shown in the drawings, and it may be possible to be modified into any shape, thickness and size so long as each of the edge projections has a structure having an edge of the flange portion 50 facing up and, thereby, engaged easily into the fixing material 67. The base of the convex portions 62, 63 may be continuously extended from the first pair of the claws 55, 56 and the second pair of the claws 57, 58, so long as these convex portions 62, 63 are bent up to form edge projections facing the above.

See FIGS. 1 and 5. The first edge projection 64 is formed between the first pair of claws 55, 56, and the second edge projection 65 is formed between the second pair of claws 57, 58. Between the first edge projection 64 and each of the first pair of the claws 55, 56, a right front supply edge 50*a* and left front supply edge 50*a* are placed. Also, between the second edge projection 65 and each of the second pair of the claws 57, 58, a right back supply edge 50*b* and left back supply edge 50*b* are placed. When the t-nuts are continuously fed on a feeding track provided on a nut fixing machine, continuously fixing a plurality of the t-nuts on a fixing material 67, the right and left back supply edges 50*b* of a t-nut in a line contact the right and left front edges 50*a* of another t-nut, which is backwardly next to the former t-nut. The edge projections 64, 65 of the former t-nut also contact projections 64, 65 of the latter t-nut. Thereby, the former t-nut, which is fed on a feeding track in a line, is avoided from overlaying the latter t-nut which is backwardly adjacent to the former t-nut on the feeding track.

The t-nut 48 is fixed into the fixing material 67 as shown in FIG. 6. Namely, into a predetermined hole 68 of the fixing material 67, the shank portion 49 is inserted, and under such condition, a caulking process is performed on the caulking portion 51, and the claws 55, 56, 57, 58 is made engaged into the fixing material 67. Even at the final stage of knocking or hammering the claws 55 to 58 into the fixing material 67, the edge projections 64, 65, as explained above, are smoothly and easily engaged into the fixing material, so as to bury the claws of the t-nut almost completely into the fixing material 67. In addition, the surface of the flange portion 50 of the t-nut is maintained parallel to the surface of the fixing material 67, as shown in FIG. 6. As a result, the t-nut 48 is very less likely to be fixed in a gradient condition and, therefore, the t-nut fixed on the fixing material 67 may firmly hold attachment components. The attachment components are omitted to be shown in the drawings.

Also, as explained above a plurality of the t-nuts 48 are continuously and in a line fed on a supply track provided on a nut fixing machine, and fixed on a fixing material 67. At the feeding in the fixing machine, the edge projections 64, 65 of the t-nut 48 faces up so that the flange portions of the t-nuts in a line does not overlay one above the other, especially between the first pair of the claws 55, 56 and between the second pair of the claws 57, 58.

Further, the t-nut 48 is fixed on the fixing material 67 by the claws 55 to 58, so that the t-nut 48 does not rotate about the fixing material 67. In addition, since the flange portion 50 and the caulking portion 51*a* caulk the fixing material as shown in FIG. 6, fixing material 67 may not be easily separated and detached from the caulked t-nut. Therefore, the t-nut 48 results in firmly fixing on the fixing material 67, and its condition for fixing is maintained for semi-permanence.

FIG. 7(*a*) shows a second embodiment of the t-nut 69 according to the present invention. For convenience, the same portions as the t-nut 48 as described before are numbered by the same symbols of the t-nut 48. The t-nut 69 as shown has a first pair of claws 55, 56 formed on the first edge and a second pair of claws 57, 58 formed on the second edge 70. The first edge and the second edge 70 are curved. The first edge is omitted to show in the drawings because the first pair of the claws 55, 56 formed on the first edge is symmetric to the second pair of the claws 57, 58 formed on the second edge 70, according to the second embodiment of the present invention. The t-nut 69 also has a ring-shaped marking line 54, which is formed when forming the caulking portion 51 and the base portion, that is female screw portion 52. The ring-shaped marking line 54 is formed on the outer surface on the border between the caulking portion 51 and the female screw portion 52. Though FIG. 7(*a*) shows the ring-shaped mark line 54, it is possible that the ring-shaped mark line 54 is omitted to be formed as shown in FIG. 7(*b*). All the structures of the t-nut 69 except the first and the second edge 70, as curved, are the same as those of the t-nut 48, as shown in FIG. 1. The same symbols are used on the same portions and, therefore, duplicate description is omitted. Also, the functions and effects of the t-nut 69 is the same as those of the t-nut 48, so that duplicated description is omitted.

Also, the edge projections 64, 65 are formed by bending the convex portions of the t-nut 69 up. Each of the edge projections 64, 65 may be placed on the first and the second edge 70, or inside the first and the second edge 70, or outside the first and the second edge 70. The edge projections 64, 65 are extended between the first pair of the claws 55, 56, and between the second pair of the claws 57, 58.

The t-nuts 48 are continuously and in a line fed on a supply track provided on a nut fixing machine, and they are fixed on the fixing material 67. The t-nut of the present invention, as explained above, do not overlay one above the other, especially between the first pair of the claws 55, 56, and between the claws 57, 58. In addition, each of the edge projections of the t-nut faces the edge of the flange up, so that the t-nut may be engage the claws into the fixing material 67 completely. In addition, the flange portion, when fixed on the fixing material 67, is conditioned to be parallel to the fixing material. So long as such functions and effects are satisfied, the t-nut may be formed in any shape and size. In the drawings, the end projections if formed by bending the edge of the flange portion at an angle of 90°. However, the present invention is not limited to bending at an angle of 90°, but may be bent at an angle of less than 90° or more than 90°. When the edge of the flange portion is bent at an angle of less than 90°, the edge projections 64, 65 are placed outside the first and second edges 70. On the other hand, when the edge of the flange portion is bent at an angle of more than 90°, the edge projections 64, 65 are placed inside the first and second edges 70.

Figure 10:
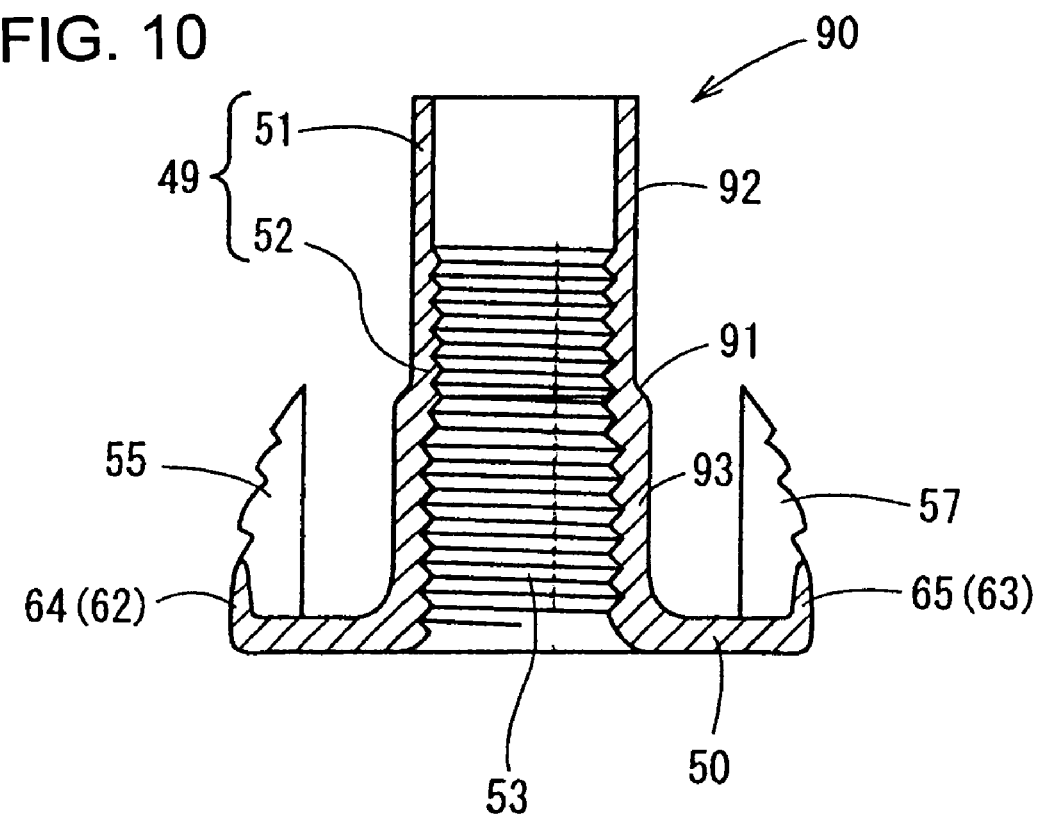
FIG. 10 shows an enlarged cross sectional view of the t-nut 90 as the third embodiment of the present invention, showing the center thereof.

FIG. 10 shows a third embodiment of the t-nut 90 of the present invention, having edge projections 64, 65. The same symbols are used as those of the t-nuts as the first and second embodiments for convenience.

The t-nut 90 is integrally formed of a metal material, having a shank portion 49 with a first end and a second end, and a flange portion 50 extending horizontally and outwardly from the first end of the shank portion 50.

The shank portion 49 has a bump portion 91 formed on the shank portion. On the border of the bump portion 91, the shank portion 49 has a tip-side cylinder portion 92 closer to the second end of the shank portion, and a base-side enlarged cylinder portion 93 closer to the first end of the shank portion. The inner surface of the base-side enlarged cylinder portion 93 has an inner diameter larger than that of the tip-side cylinder portion 92, and the outer surface of the base-side enlarged cylinder portion 93 has an outer diameter larger than that of the tip-side cylinder portion 92.

The tip-side cylinder portion 92 has a caulking portion 51 formed from the second end for a predetermined length, terminating at a point about the half length of the tip-side cylinder portion 92. Except the caulking portion 51, a female screw 53 is formed on the inner surface of the shank portion 49. The portion forming the female screw 53 is a female screw portion 52. The female screw portion 52 has an inner diameter smaller than the caulking portion 51. The t-nut 90 has the female screw 53 continuously formed from the first end for a given length, terminating at a point about the half length of the tip-side cylinder portion 92.

A first pair of claws 55, 56 is formed on the first edge of the flange portion 50. A second pair of claws 57, 58 (not shown in the drawing) is formed on the second edge of the flange 50. These claws 55 to 58 are formed by cutting the first and second edges of the flange portion 50, and bend them up so as to extend vertically along the shank portion 49. Each of the claws in pairs faces each other across a first radial direction of the flange portion 50. The first radial direction extends horizontally from the center axis of the shank portion 49.

The flange portion 50 has a pair of flat portions (not shown in the drawing) projecting outwardly and horizontally from the first end of the shank portion 49. The pair of the flat portions is formed symmetrically, placing on a second radial direction. The second radial direction extends horizontally from the center axis of the shank portion 49, crossing the first radial direction at an angle of 90°. Each of the claws in pairs 55, 56, 57, 58 is placed adjacent to each other. Each of the claws is extended from a liner edge or a curved edge. The flange portion 50, when viewed from the above, is shaped, as a whole, into an exact or almost octagonal form.

As explained above, the first pair of the claws 55, 56 and the second pair of the claws 57, 58 are placed symmetrically. Between the first pair of the claws 55, 56 and between the second pair of the claws 57, convex portions 62, 63 are formed by cutting edges of the flange portion 50. The convex portions 62, 63 are also located on the first radial direction of the flange portion 50. Similar to the first and second embodiments of the t-nut, the convex portions 62, 63 are bent up to face the edge to the above, so as to form the edge projections 64, 65. The edge projections 64, 65 are placed on the first and second edges, or inside the first and second edges, or outside the first and second edges.

Figure 12:
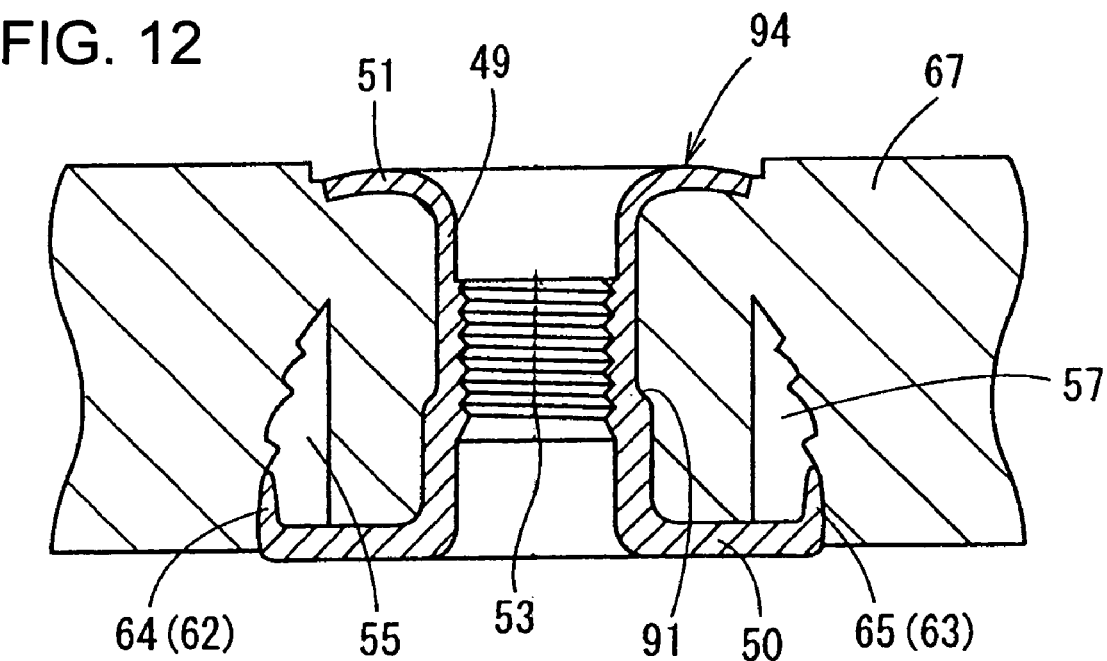
FIG. 12 shows a cross sectional view of the t-nut 94 as the fourth embodiment of the present invention, showing the condition where the t-nut 94 is fixed at the penetrating hole of the fixing material by caulking.

The t-nut 90 is fixed to the fixing material in the same manner as explained in connection with the t-nut 48 as the first embodiment. See FIG. 6. FIG. 12 shows the condition of the attachment of the t-nut 90, but further explanation, therefore, is omitted.

Figure 11:
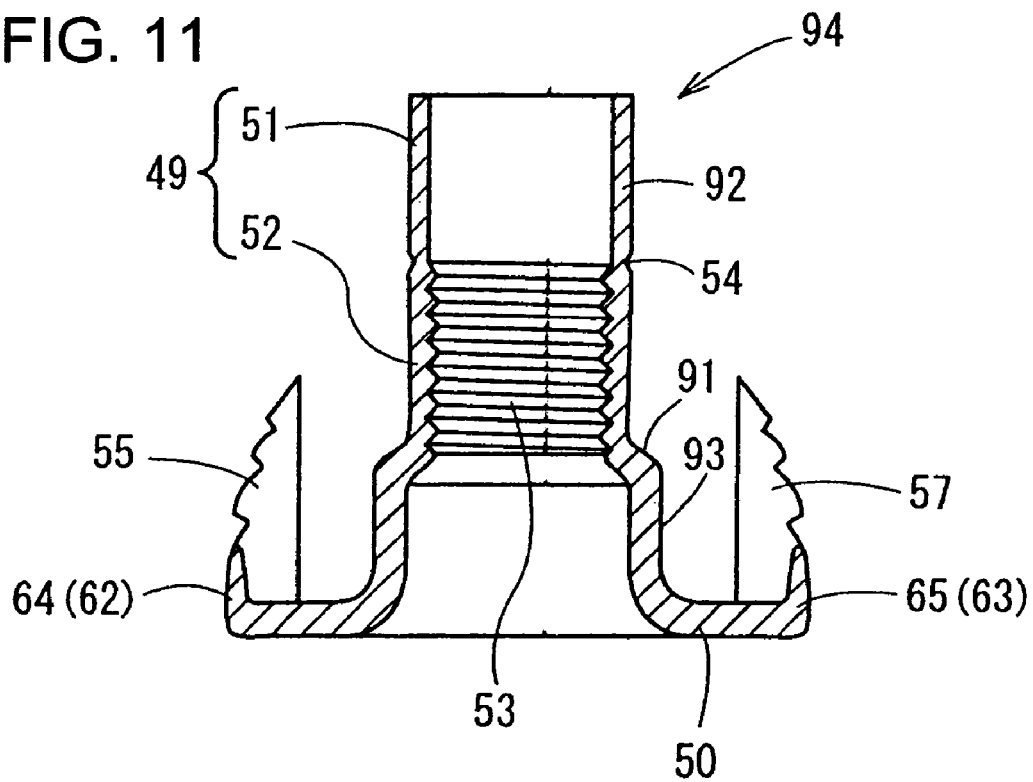
FIG. 11 shows an enlarged cross sectional view of the t-nut 94 as the fourth embodiment of the present invention, showing the center thereof.

FIG. 11 shows a t-nut 94 as a fourth embodiment of the present invention, having edge projections 64, 65. A bump portion 91 forms to divide the t-nut into the tip side cylinder portion 92 and a base-side enlarged cylinder portion 93. The ring-shaped marking line 54 forms to divide the t-nut into a caulking portion 51 and a base portion. That is, the ring-shaped marking line 54 is formed on the outer surface of the tip-side cylinder portion 92 at a border between the caulking portion 51 and the base portion, that is female screw portion 52. The base-side enlarged cylinder portion 93 of the t-nut 94 is shaped into a cylindrical tube, having both an inner diameter and an outer diameter larger thereof than those of the tip-side cylinder portion 92. Also, the female screw is formed at the base portion at the inner surface of the tip-side cylinder portion 92, extending between the bump portion 91 and the border, which corresponds to the ring-shaped marking line 54. The other portions are formed in the same manner as the t-nut 90 as the third embodiment, so that the same portions are identified as the same symbols and further explanation is omitted. The t-nut 94 may be attached on a fixing material 67 in a similar manner to the explanation as stated in connection with the t-nut 48 as the first embodiment, as shown in FIG. 6.

Figure 13:
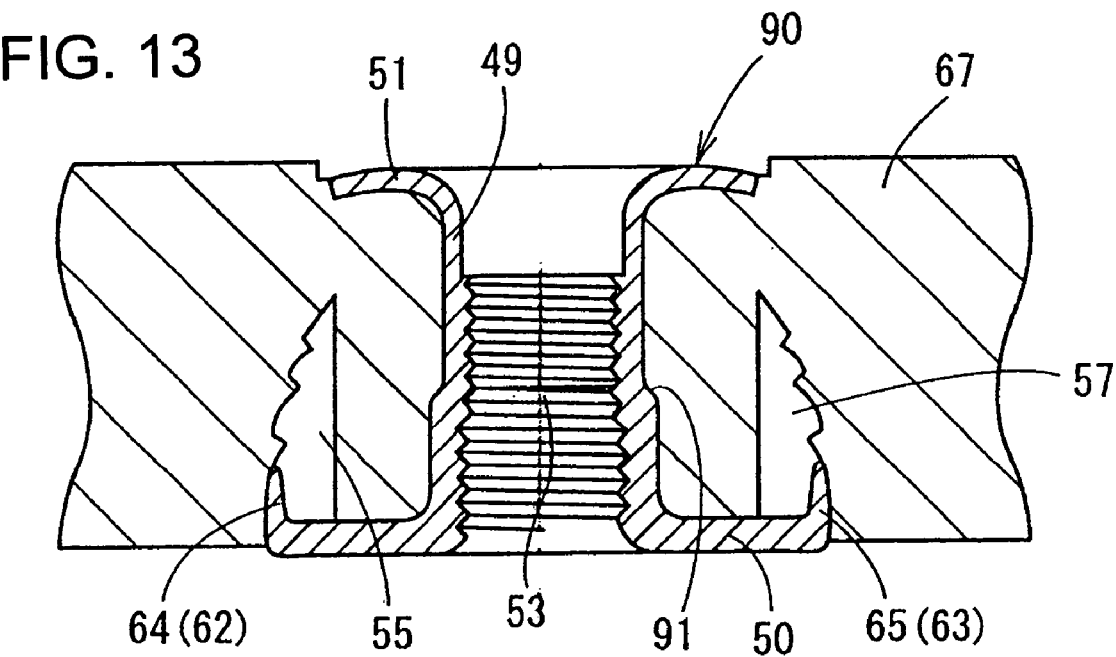
FIG. 13 shows a cross sectional view of the t-nut 90 as the third embodiment of the present invention, showing the condition where the t-nut 90 is fixed at the penetrating hole of the fixing material by caulking.

FIG. 13 shows the condition of the attachment of the t-nut 94, and further explanation is omitted.

Figure 14:
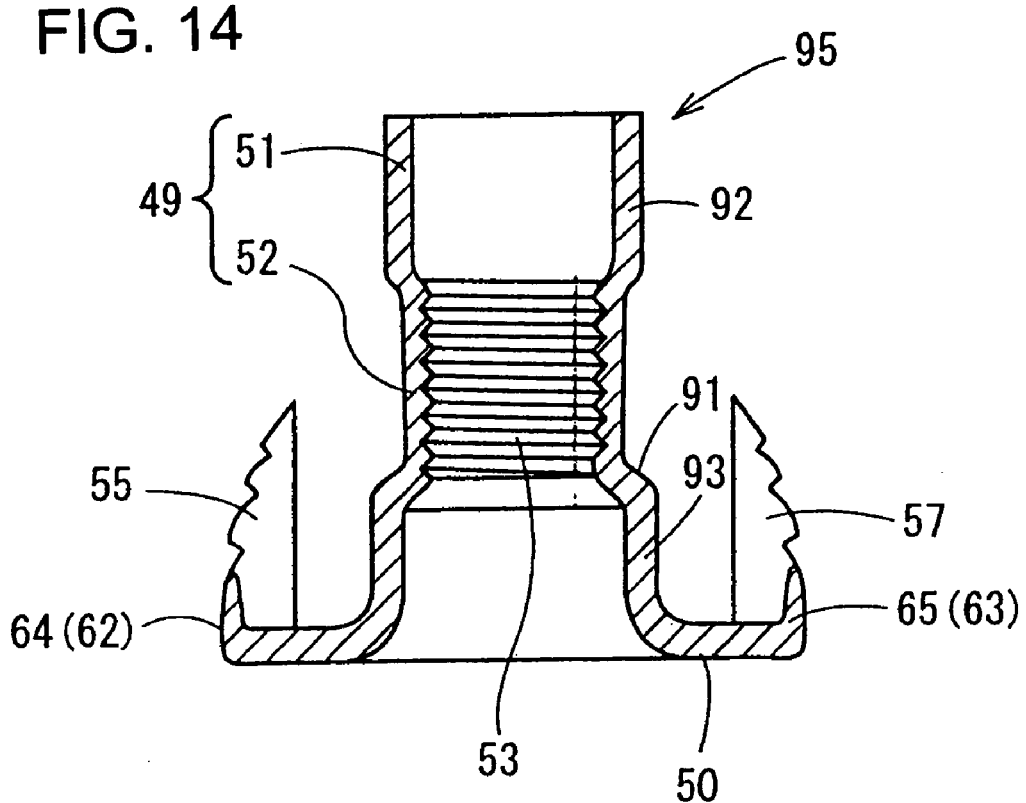
FIG. 14 shows an enlarged cross sectional view of the t-nut 95 as the fifth embodiment of the present invention, showing the center thereof.
Figure 15:
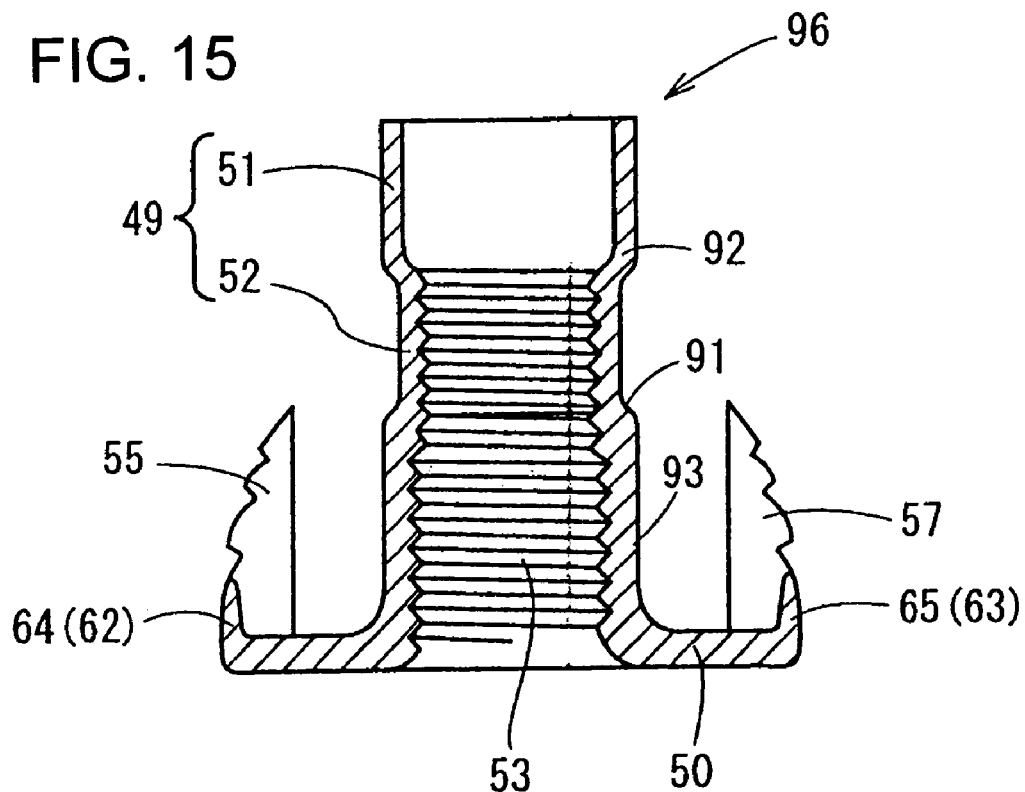
FIG. 15 shows an enlarged cross sectional view of the t-nut 96 as the sixth embodiment of the present invention, showing the center thereof.
Figure 16:
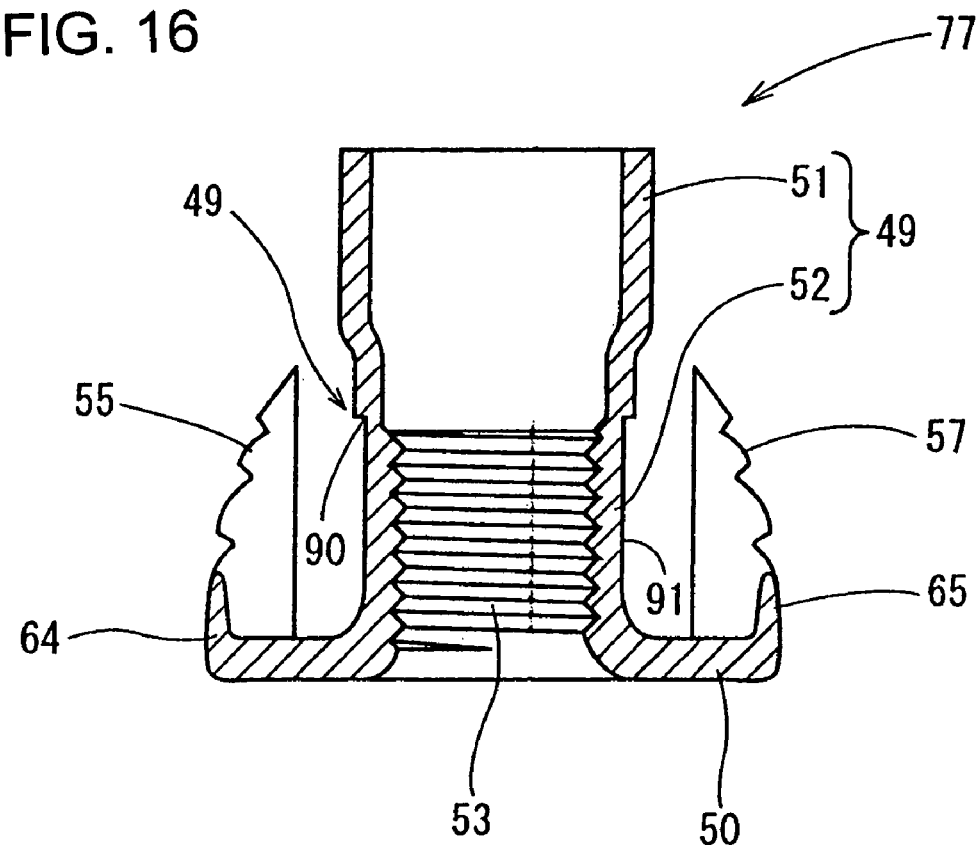
FIG. 16 shows an enlarged cross sectional view of another t-nut 77 according to the present invention, showing the center thereof.
Figure 17:
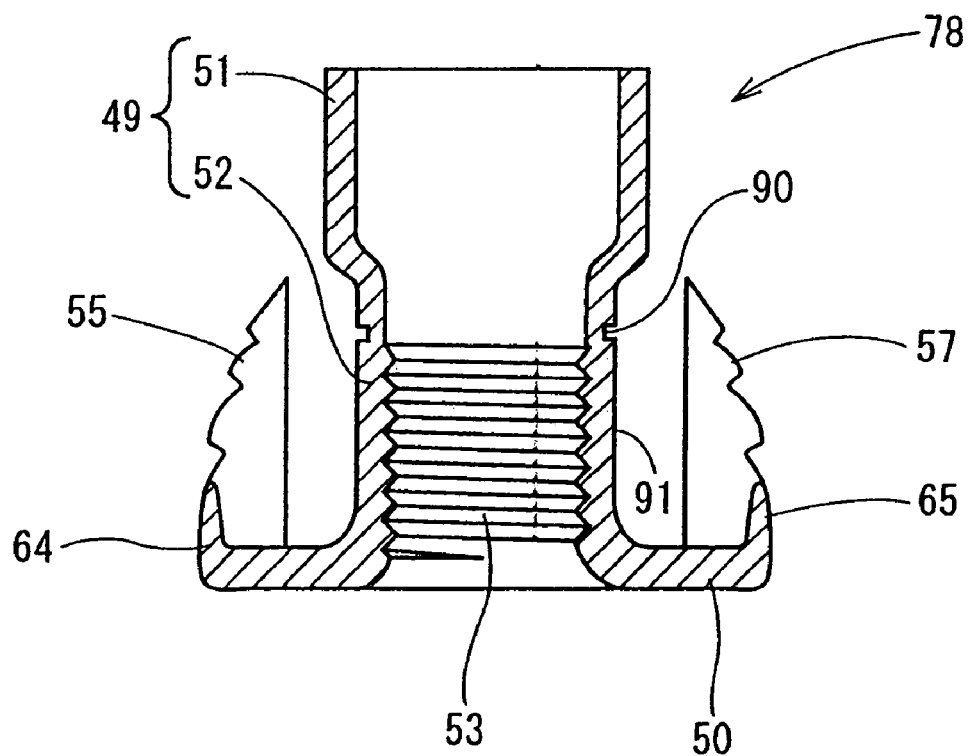
FIG. 17 shows an enlarged cross sectional view of another t-nut 78 according to the present invention, showing the center thereof.

FIG. 14 shows a t-nut 95 as a fifth embodiment of the present invention, having the edge projections 64, 65. FIG. 15 shows a t-nut 96 as a sixth embodiment of the present invention, having the edge projections 64, 65. The t-nuts 95, 96 is designed to have the caulking portion 92 of the shank portion 49 having an inner diameter larger than the female screw portion 52. Of course, the caulking portion 92 of the shank portion 49 is thinner than the female screw portion 52. The other portions are formed in the same manner as the t-nut 94 as the fourth embodiment as shown in FIG. 11, and the t-nut 90 as the third embodiment shown in FIG. 10, so that the same portions are identified as the same symbols and further explanation is omitted. According to the t-nuts 90, 94, 95, 96 as the third, fourth, fifth and sixth embodiments shown in FIGS. 10, 11, 14 and 15, the bump portion 91 is provided at the base-side enlarged cylinder portion 93 closer to the flange portion 50. The tip-side cylinder portion 92, including the caulking portion 51 and the female screw portion 52, may be designed to be shorter than a conventional t-nut. Therefore, even if the shank portion 49 is made long, the length at the female screw portion 52 is not made longer than necessary, and may be designed to be the shortest so long as the product is according to the standard of measure (Industrial Standard) such as JIS.

As explained above, the base-side enlarged cylinder portion 93 is designed to have a cylindrical tube, in which the inner diameter and outer diameter thereof are larger than those of the tip-side cylinder portion 92. At the time of using the t-nut of the present invention, the shank portion 49 is knocked and hammered into a penetrating hole of a fixing material 67, whose diameter is almost the same as the outer diameter of the tip-side cylinder portion 92. At that time, the base-side enlarged cylinder portion 93 is inserted into the hole under pressure, avoiding generation of a gap between the outer surface of the tip-side cylinder portion 92 and the inner surface of the penetrating hole, as shown in FIGS. 12 and 13. Therefore, the t-nut can be firmly fixed to the fixing material.

Figure 18:
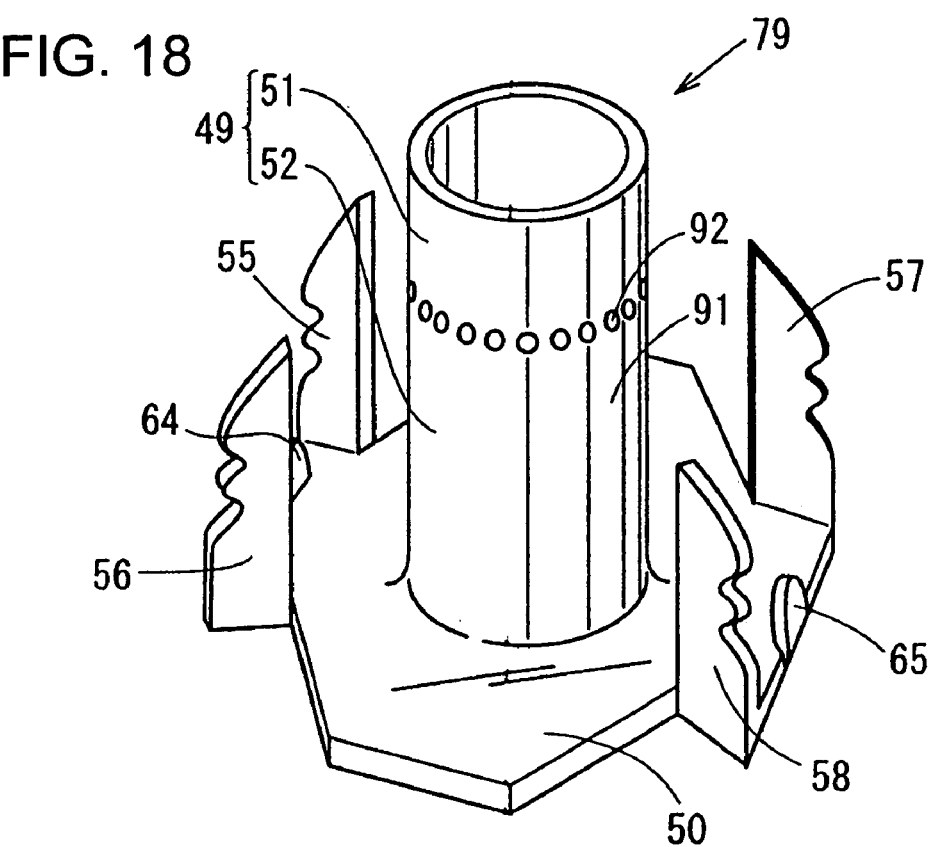
FIG. 18 shows an enlarged perspective view of another t-nut according to the present invention.
Figure 19:
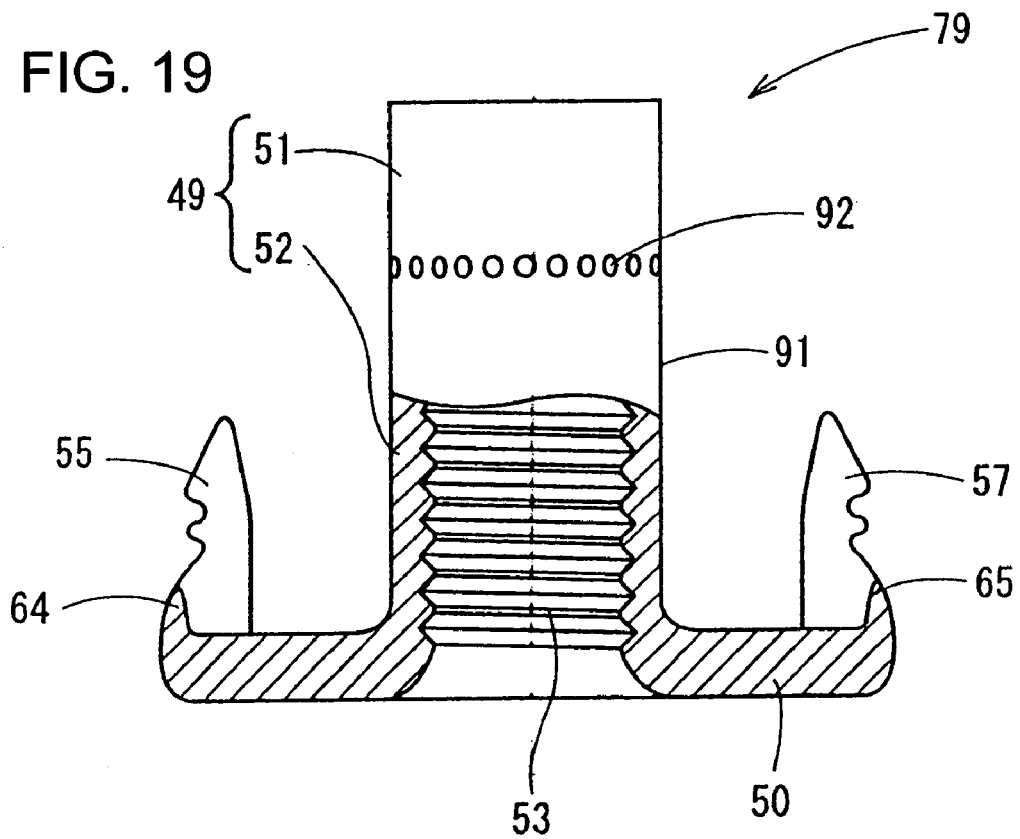
FIG. 19 shows an enlarged plan view of the t-nut as shown in FIG. 18, partially showing its cross sectional view at the center thereof.
Figure 22:
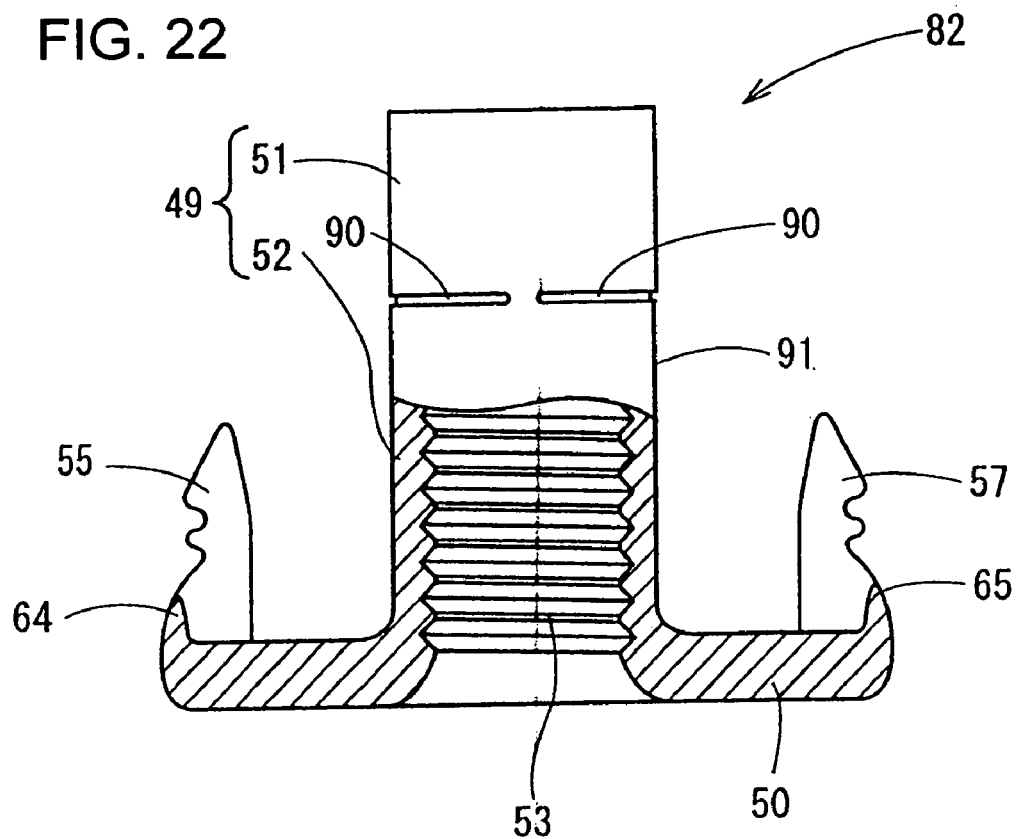
FIG. 22 shows an enlarged plan view of the t-nut, partially showing its cross sectional view at the center thereof.
Figure 23:
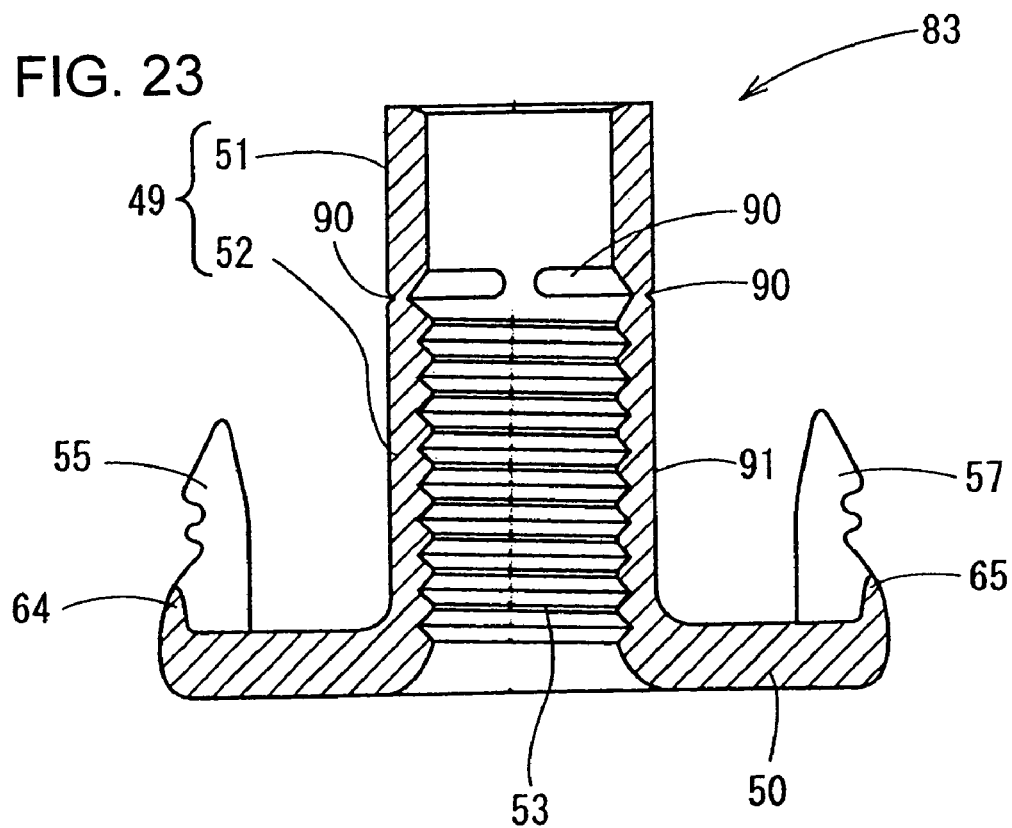
FIG. 23 shows an enlarged cross sectional view of another t-nut according to the present invention, showing the center thereof.
Figure 24:
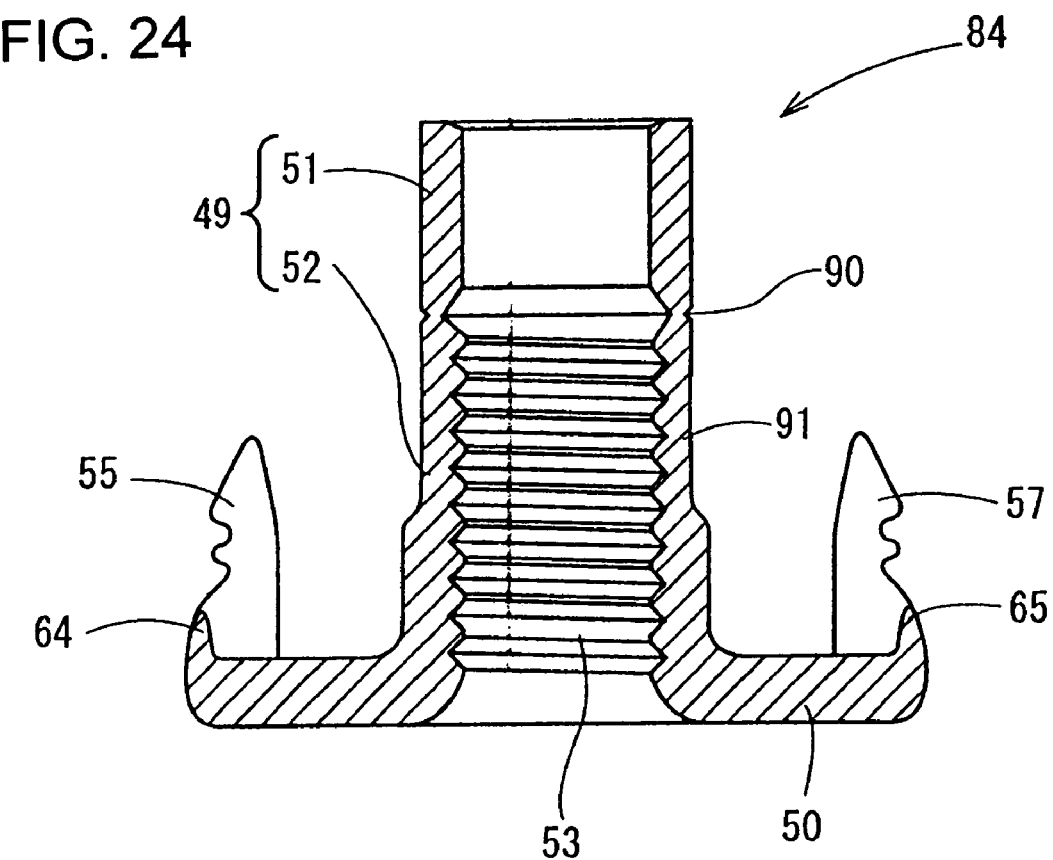
FIG. 24 shows an enlarged cross sectional view of another t-nut according to the present invention, showing the center thereof.
Figure 25:
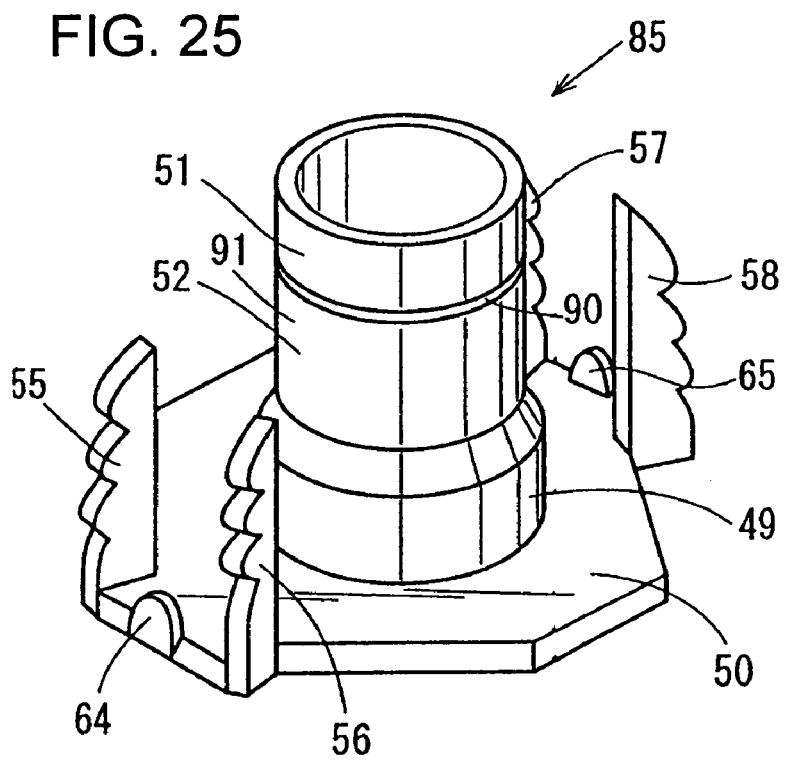
FIG. 25 shows an enlarged perspective view of another t-nut according to the present invention.
Figure 29:
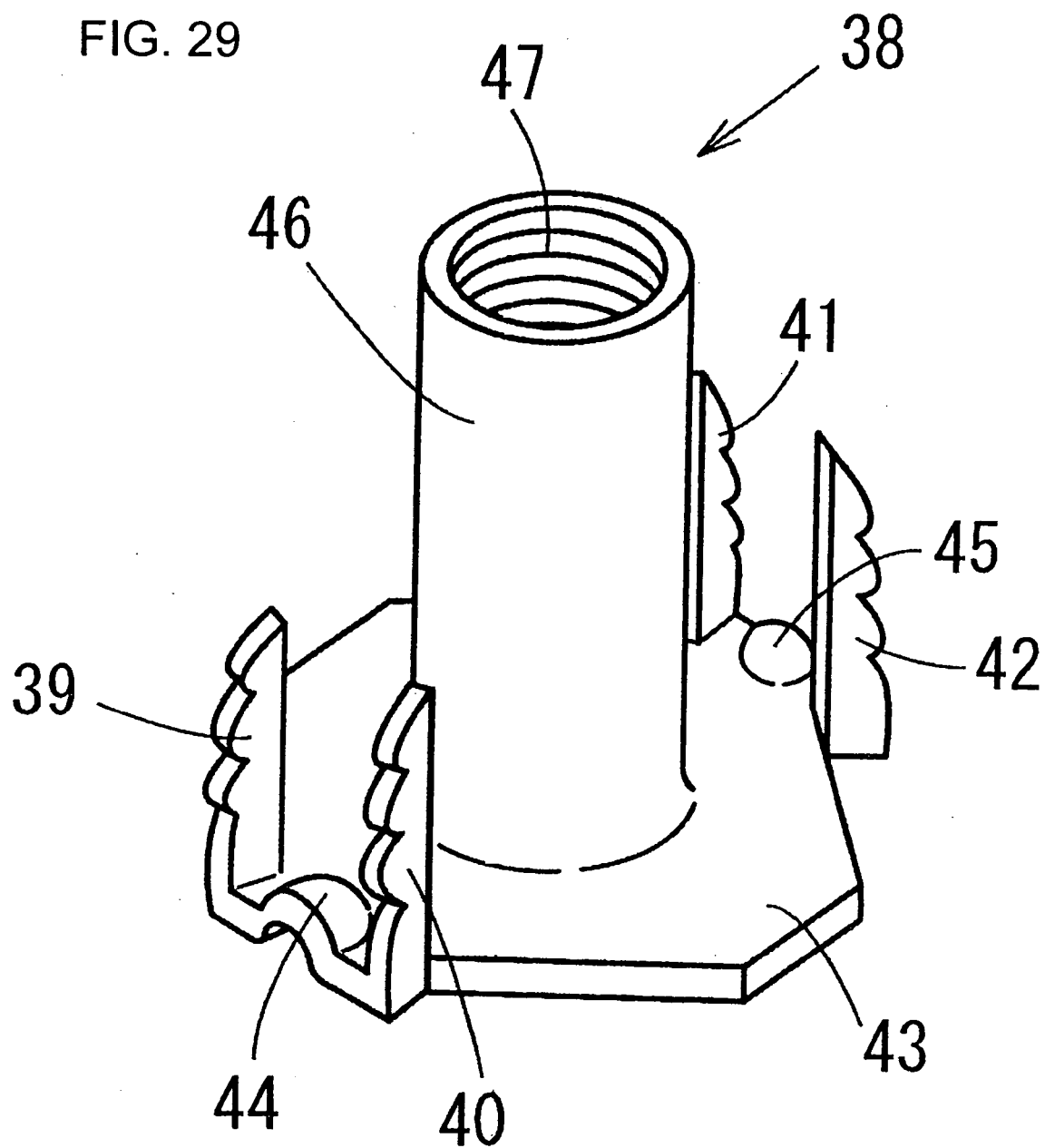
FIG. 29 shows a perspective view of a prior art t-nut, which is interested in the present invention.
Figure 30:
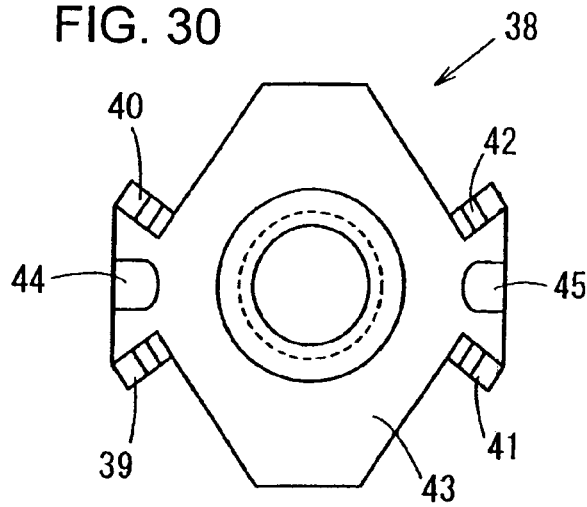
FIG. 30 shows a bottom view of the t-nut as shown in FIG. 29.
Figure 31:
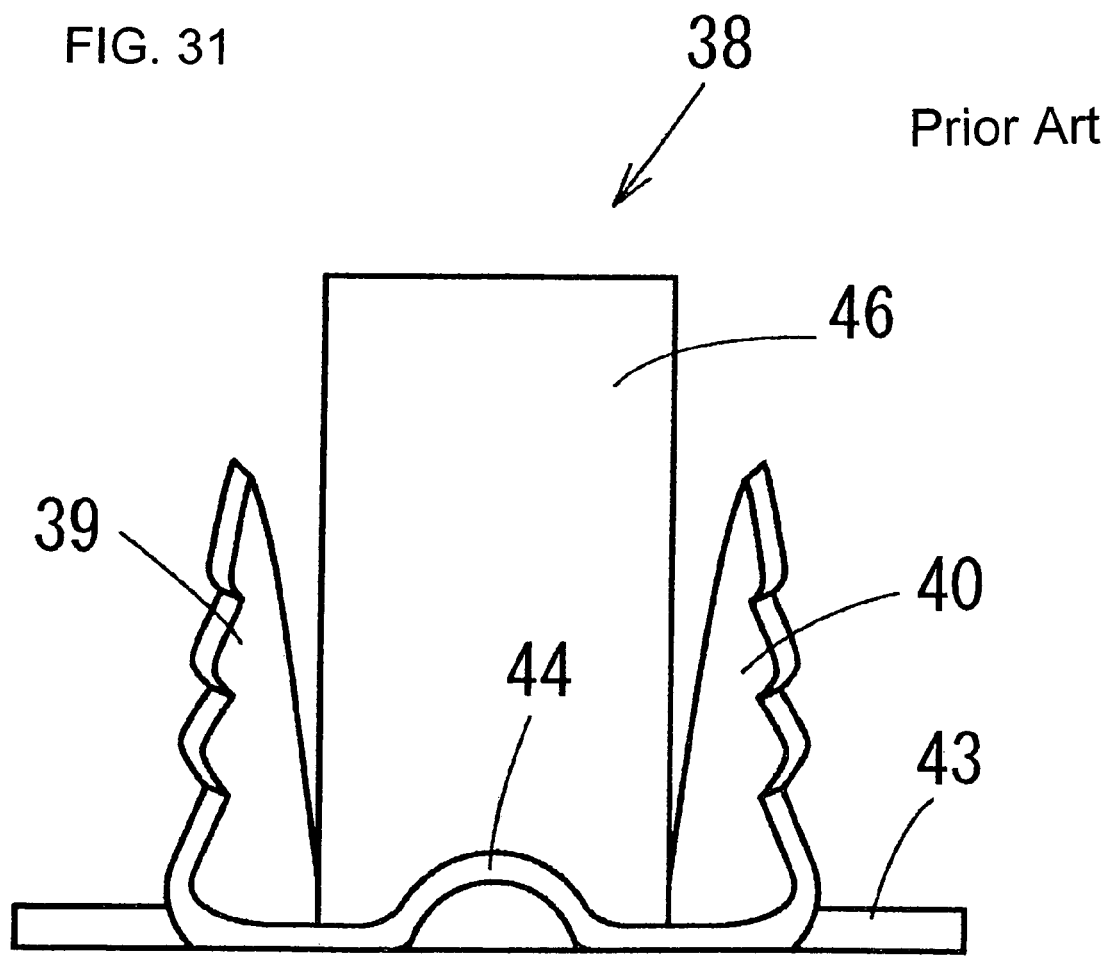
FIG. 31 shows a plan view of the t-nut as shown in FIG. 29.
Figure 32:
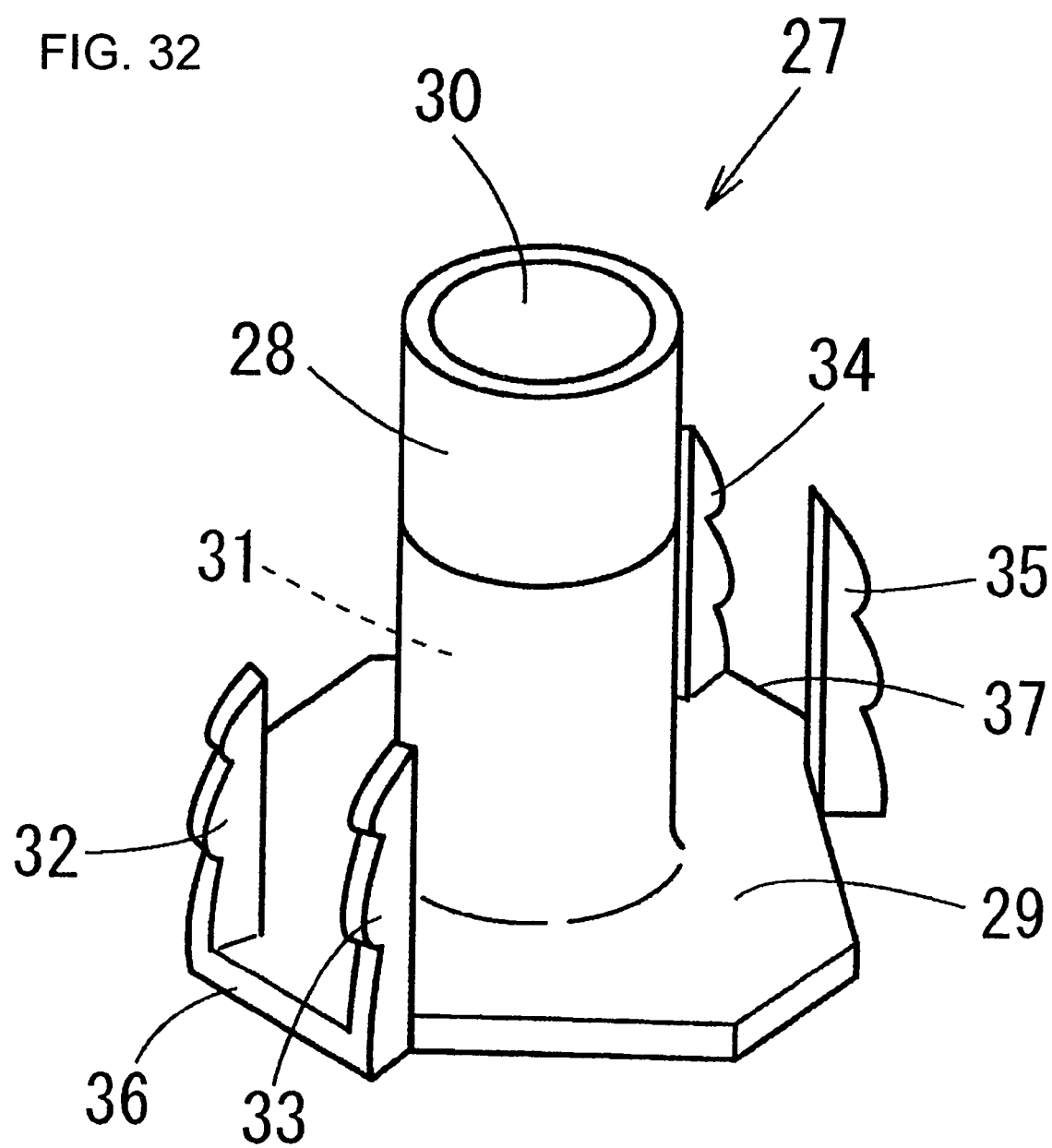
FIG. 32 shows a perspective view of a prior art t-nut, which is interested in the present invention.
Figure 33:
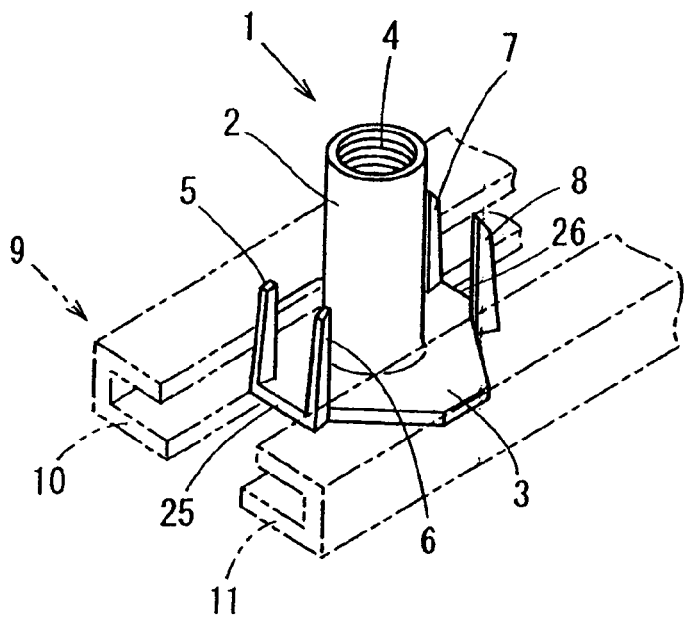
FIG. 33 shows a perspective view of a prior art t-nut which is interested in the present invention, showing the condition of transferring.
Figure 34:
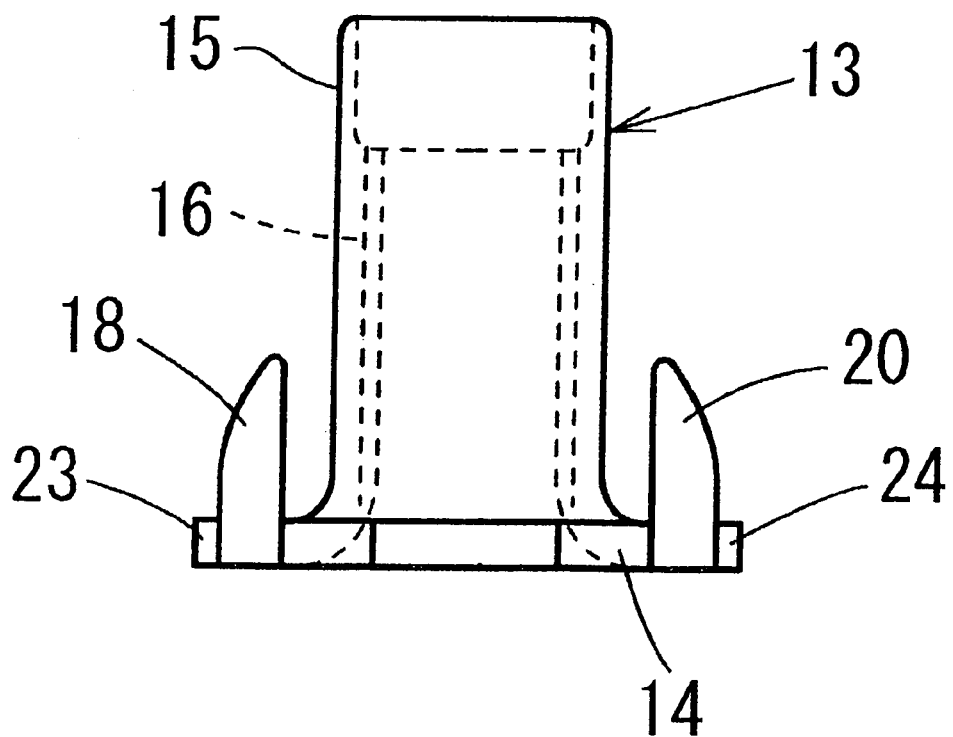
FIG. 34 shows a plan view of another prior art t-nut, which is interested in the present invention.
Figure 35:
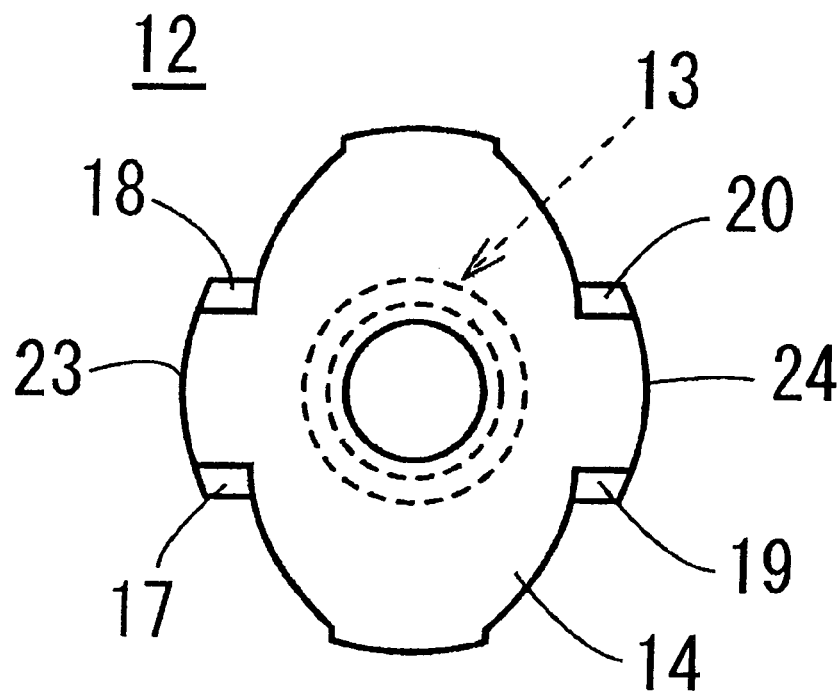
FIG. 35 shows a bottom view of the t-nut as shown in FIG. 34.
Figure 36:
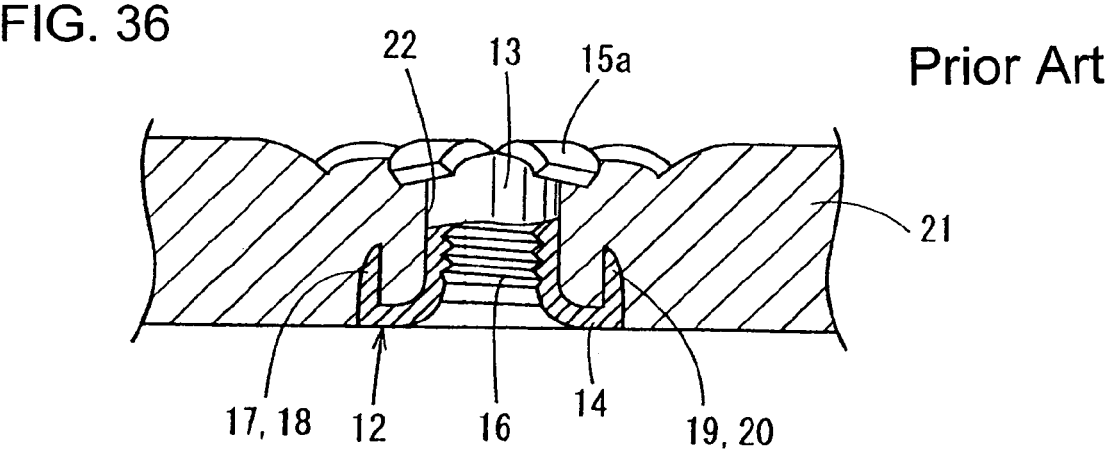
FIG. 36 shows a cross sectional view of the t-nut as shown in FIG. 34, showing the condition in use.

Also, the t-nut of the present invention, as explained above, has the edge projections 64, 65, which may be modified into the t-nuts 77, 78 as shown in FIGS. 16–28. For convenience, the symbols are used as the same manner as the first to sixth embodiments, and further explanation is omitted. These t-nuts 77, 78 has a trench 90 formed on the region where the shank portion 49 is bent at the time of caulking. The trench is circumferentially formed on the outer surface and/or inner surface diameter of the shank portion 49. The trench 92 does not break by a force worked in an axis direction, which works on to the fixing material under a use condition in fixing and caulking, but breaks and separates the shank portion into two fragments when a tensile strength beyond a predetermined level is applied. The trench is formed on the outer surface and the inner surface, or on the outer surface or on the inner surface, by partially thinning the thickness of the shank portion 49. Instead, a plurality of craters 92 as shown in FIGS. 18 and 19 may be formed circumferentially on the shank portion. Therefore, according to the present invention, the trench may be any shape and size, including craters 92, so long as the functions as explained in connection with the trench 90 above is accomplished.

Under a condition of caulking of the t-nut on the fixing material, the shank portion 49 of the t-nuts 77, 78 as shown in FIGS. 16–28 may be easily separated into two fragments at the thinned portion, that is trench 92, by applying a specific tool which generates a tensile stress in the direction of the central axis at the trench. As a result, the t-nut, in which the flange portion 50 and the caulking portion 51 holds the fixing material on their upper and lower surfaces, may be easily detached from the fixing material. Therefore, when a product which is fixed by caulking by these t-nuts is no longer in use, the fixing material, such as wood, may be separately collected for recycling use.

The trench 90 may be continuously formed around the shank portion, or discontinuously formed at least a part of the shank. Instead, the trench 90 may be formed on at least one of the inner surface and the outer surface of the shank portion 49, for example, near the border between the caulking portion 51 and the base portion. Instead, the trenches 90 may be formed on both of the inner surface and the outer surface of the shank portion 49, for example, near the border between the caulking portion 51 and the base portion, each of the trenched being opposed to each other.

The trench 90 may have an almost flat bottom surface having a predetermined width, or an almost flat bottom surface having a predetermined width. Also, the trench 90 formed on the outer surface of the shank portion 49 may be formed to be opposed to the bottom surface f the trench formed on the inner surface of the shank portion. Also, the trench 90 may be further provided with a wrinkle trench having a width smaller than the width of the trench 90, especially at the inner surface of the shank portion 49. Further, the trench 90 may preferably have a cross section selected from the group consisting of V-shape, U-shape and C-shape.

Also, the caulking portion 51 of the shank portion 49 may have an inner diameter larger than that of the portion 91 besides the caulking portion, and the outer diameter of the caulking portion 51 is substantially the same as that of the portion besides the caulking portion. Also, the caulking portion 51 of the shank portion 49 may have an inner diameter larger than that of the portion 91 besides the caulking portion, and the outer diameter of the caulking portion 51 is larger than that of the portion besides the caulking portion.

Also, at the inner surface of the portion 91 besides the caulking portion, it may be possible to provide a region of thin thickness, by depressing for a predetermined width in the direction of the extension of the shank portion 49, where the female screw is not formed, and the trench 90 may be formed on the outer surface or the inner surface of the region of thin thickness.

Also, it is possible that compared with the portion 91 besides the caulking portion 51, the trench 90 is formed by being extended in the direction of the radial direction of the shank portion 49, at the border between the caulking portion 51 and the portion 91 besides the caulking portion 51. In this case, the inner and outer diameters of the caulking portion 51 are partially shrunk or enlarged.

See FIG. 4. In the T-nut as described above, the flange portion is shaped, as a whole, into an exact or almost octagonal form, having the following relationship: L>L1, L<L1, or L=L1, wherein "L" represents a side length of the flange portion, and "L1" represents a longitudinal length thereof. In particular, the side length and the longitudinal length are preferably satisfy with the following formula: $0.7 \leq (L/L1) \leq 1.3$.

Figure 9:
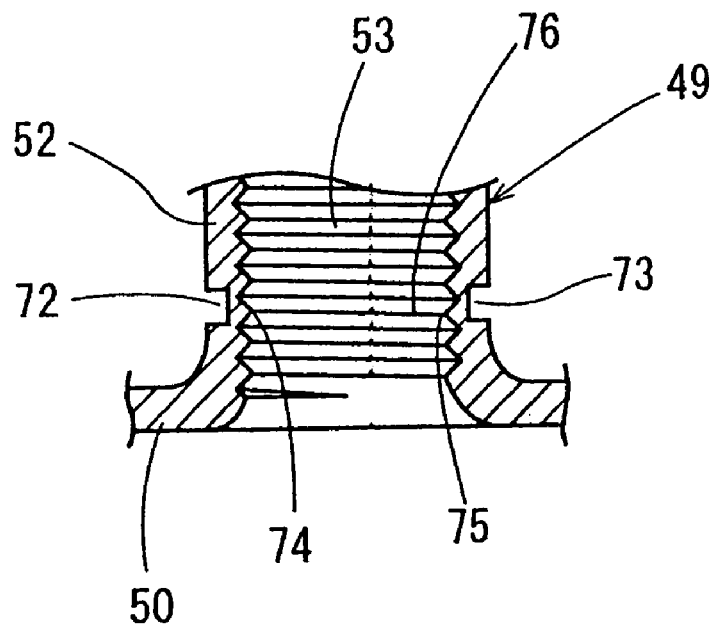
FIG. 9 shows an enlarged cross sectional view of the t-nut, at the center thereof, showing the female screw portion made irregular.

FIG. 9 shows a structure effectively to avoid a bolt attached to the CB hoper feed T-nut from loosing, if provided on the female screw portion 52 of the T-nut of the present invention. Namely, the outer surface of the female screw portion 52 is partially depressed inwardly, as shown in the drawing. Thus, the outer surface of the female screw portion 52 has two concave portions 72, 73 at an interval angle of 180°. The concave portions 72, 73 is formed by sandwiching a predetermined portion of the female screw portion 52 by means of an appropriate tool, followed by strongly pressing it in the direction of the female screw portion 52. The drawing shows two concave portions 72, 73, but the numbers of the concave portion is not limited to two, and may be one or three or more.

As a result, the female screw 53, having the concave portions, is partially made irregular. Due to such irregular portions 74, 75, a bolt, not shown in the drawing, is screw-engaged with the female screw 53, by applying a comparatively large force in order to rotate the bolt because of the irregular portion. At that time, a portion 76 of the female screw may be deformed at the irregular portions 74, 75. As a result, the bolt is locked at the female screw 53 under a screw-engagement condition, thereby avoiding the bolt from loosing from the t-nut.

The t-nut of the present invention is not limited to the shapes of the drawings, and may be modified into various shapes.

EFFECT OF THE INVENTION

As explained above, the t-nut of the present invention has the edge projections formed between the claws in pairs, which are formed by cutting the edges of the flange portion to form convex portions, followed by bending them up to along the shank portion, each claws in pairs being placed adjacent to each other. Therefore, while a plurality of the t-nuts are supplied on a supply track provided on a nut applying machine, the flange portions of t-nuts, fed continuously and in a line, do not overlay one above the other.

Also, the t-nut of the present invention may engage its edge projections completely into the fixing material, even at the final stage of the knocking or hammering the claws into the fixing material. Therefore, the t-nut of the present invention does not generate a gap between the outer surface of the fixing material and the flange portion fixed. In addition, the t-nut of the present invention may be engaged into the fixing material with keeping the proper condition, avoiding from being engaged in an inclined manner with respect to the penetrating hole of the fixing material. Also, even if the fixing material is made of a wood or synthesis resin, the edge projections may be easily engaged into the fixing material, so as to avoid generation of a crack near the penetrating hole of the fixing material. Therefore, a bolt may be completely engaged with the female screw of the t-nut, so that an attachment component may be stably fixed with the fixing material. Further, it is unnecessary to consider making the length of the shank portion slightly long in view of the portion not engaged completely, which involves in a conventional t-nut. Therefore, this may reduce the production cost and sales cost of the t-nut of the present invention.

The symbols in the description are summarized below:
48: t-nut, 49: shank portion, 50: flange portion, 51: caulking portion (tip portion), 52: female screw portion (base portion), 53: female screw, 54: ring-shape mark line, 55 to 58: claw, 59: flat portion, 60: linier edge, 61: linier edge, 62, 63: convex portion, 62a, 63b: convex portion, 64, 65: projection, 64a, 65b: projection, 67: fixing material, 68: penetrating hole, 70, 71: curved edge, 72, 73: crater, 74, 75: irregular portion, 91: bump portion, 92: tip-side cylinder portion, 93: base-side enlarged cylinder portion,

What is claimed is:

1. A method for preparing a t-nut comprising the steps of:
   (i) providing a metal board;
   (ii) cupping the metal board, wherein a non-cupped metal board becomes a flange portion extending horizontally, having a first edge and a second edge opposed to the first edge, wherein the first edge has a first protruded portion extending outward, wherein the second edge has a second protruded portion extending outward;
   (iii) penetrating a hole on a bottom of the cupped metal board so as to form a shank portion shaped in a cylindrical tube extending vertically, wherein the shank portion comprises a base portion having a first end with the flange portion, and a caulking portion at a second end;
   (iv) forming a female screw on an inner surface of the base portion;
   (v) bending up a portion of the first edge of the flange to form a first pair of the claws to extend generally parallel to the shank portion;
   (vi) bending up a portion of the second edge of the flange to form a second pair of the claws to extend generally parallel to the shank portion;
   (vii) bending up the first protruded portion between the first pair of claws such that, the first edge at the first protruded portion being faced up,
   (viii) bending up the second protruded portion between the second pair of claws such that, the second edge at the second protruded portion being faced up.

2. A method according to claim 1, wherein after the first protruded portion and the second protruded portion have been bent they do not exceed the first edge and the second edge, respectively, when being viewed from above.

3. A method for preparing a t-nut comprising the steps of:
   (i) providing a metal board;
   (ii) cupping the metal board,
   (iii) cutting the metal board where the metal board is not cupped, to form a flange portion extending horizontally, the flange portion having a first edge and a second edge opposed to the first edge, the first edge having a first protruded portion extending outward, and the second edge having a second protruded portion extending outward;
   (iv) penetrating a hole on a bottom of the cupped metal board so as to form a shank portion shaped in a cylindrical tube extending vertically, wherein the shank portion comprises a base portion at a first end with the flange portion, and a caulking portion having a second end;
   (v) forming a female screw on an inner surface of the base portion;
   (vi) bending up a portion of the first edge of the flange to form a first pair of the claws;
   (vii) bending up a portion of the second edge of the flange to form a second pair of the claws;
   (viii) bending up the first protruded portion between the first pair of claws to face the first edge at the first protruded portion up, and
   (ix) bending up the second protruded portion between the second pair of claws to face the second edge at the second protruded portion up.

4. A method according to claim 3, wherein after the first protruded portion and the second protruded portion have been bent they do not exceed the first edge and the second edge, respectively, when being viewed from above.

* * * * *